(12) United States Patent
Okui et al.

(10) Patent No.: US 8,525,934 B2
(45) Date of Patent: Sep. 3, 2013

(54) VIDEO DISPLAY APPARATUS FOR ADJUSTING THE DEGREE OF AMPLIFICATION OF THE INPUT IMAGE ACCORDING TO IMAGE CHARACTERISTICS

(75) Inventors: Masahiro Okui, Kashiwa (JP); Toshiyuki Fujine, Osaka (JP); Yasushi Tetsuka, Osaka (JP); Ryuichi Niiyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 223 days.

(21) Appl. No.: 12/677,060

(22) PCT Filed: Jan. 23, 2009

(86) PCT No.: PCT/JP2009/051058
§ 371 (c)(1),
(2), (4) Date: Apr. 15, 2010

(87) PCT Pub. No.: WO2009/096329
PCT Pub. Date: Aug. 6, 2009

(65) Prior Publication Data
US 2010/0328535 A1    Dec. 30, 2010

(30) Foreign Application Priority Data

Jan. 30, 2008  (JP) .............................. 2008-018928
Jan. 30, 2008  (JP) .............................. 2008-018955

(51) Int. Cl.
*H04N 5/57*    (2006.01)
(52) U.S. Cl.
USPC ...................................................... 348/687

(58) Field of Classification Search
USPC ................. 348/687, 688, 678, 679, 673, 558; 382/167–169, 284, 254
See application file for complete search history.

(56) References Cited

U.S. PATENT DOCUMENTS

| 5,003,394 | A | | 3/1991 | Lagoni |
| 5,608,451 | A | * | 3/1997 | Konno et al. .................... 348/69 |
| 6,081,254 | A | * | 6/2000 | Tanaka et al. ................. 382/167 |
| 6,795,053 | B1 | | 9/2004 | Funamoto et al. |
| 6,987,534 | B1 | * | 1/2006 | Seta .......................... 348/229.1 |
| 7,179,222 | B2 | * | 2/2007 | Imaizumi et al. ............. 600/109 |
| 7,738,727 | B2 | * | 6/2010 | Chang et al. .................. 382/274 |

(Continued)

FOREIGN PATENT DOCUMENTS

| GB | 2 400 765 A | 10/2004 |
| GB | 2 405 520 A | 3/2005 |

(Continued)

*Primary Examiner* — Paulos M Natnael
(74) *Attorney, Agent, or Firm* — Birch, Stewart, Kolasch & Birch, LLP

(57) ABSTRACT

Brightness expression without solid white pattern is enabled, and video expression with an improved black level is achieved. A distortion module (5) reduces the luminance of a backlight source according to the histogram of the video signal so that the contrast may be a predetermined target one. A configuration design unit (13) sets the gain according to the luminance level ($BL_{reduced}$) of the backlight source selected by the distortion module (5). When setting the gain, the luminance level ($BL_{ref}$) for reference of the backlight source preset according to the video feature value is referenced. If the video feature value meets a predetermined condition, the input video signal is always amplified with the gain. If not, depending on the relation between the $BL_{reduced}$ and the $BL_{ref}$, the input video signal is amplified or not.

15 Claims, 18 Drawing Sheets

(56) References Cited

U.S. PATENT DOCUMENTS

| | | | |
|---|---|---|---|
| 7,948,524 B2 * | 5/2011 | Endo et al. | 348/222.1 |
| 7,956,886 B2 * | 6/2011 | Murayama | 348/42 |
| 2003/0189558 A1 | 10/2003 | Aoki et al. | |
| 2004/0201561 A1 | 10/2004 | Funamoto et al. | |
| 2005/0104838 A1 | 5/2005 | Sasaki | |
| 2006/0192899 A1 | 8/2006 | Ogita | |
| 2006/0221046 A1 | 10/2006 | Sato et al. | |
| 2006/0274026 A1 | 12/2006 | Kerofsky | |
| 2007/0019937 A1 * | 1/2007 | Endo | 396/52 |
| 2007/0024573 A1 | 2/2007 | Kamimura | |
| 2007/0097069 A1 | 5/2007 | Kurokawa et al. | |
| 2007/0216636 A1 | 9/2007 | Lo | |

FOREIGN PATENT DOCUMENTS

| | | |
|---|---|---|
| JP | 6-62277 A | 3/1994 |
| JP | 6-350874 A | 12/1994 |
| JP | 2001-27890 A | 1/2001 |
| JP | 2001-134226 A | 5/2001 |
| JP | 2002-278503 A | 9/2002 |
| JP | 2003-167544 A | 6/2003 |
| JP | 2003-298974 A | 10/2003 |
| JP | 2003-309741 A | 10/2003 |
| JP | 2006-101363 A | 4/2006 |
| JP | 2006-267995 A | 10/2006 |
| JP | 2006-276677 A | 10/2006 |
| JP | 2007-36728 A | 2/2007 |
| JP | 2007-140436 A | 6/2007 |
| JP | 2007-219477 A | 8/2007 |
| RU | 2100911 C1 | 12/1997 |
| WO | WO 01/22726 A1 | 3/2001 |
| WO | WO 2005/109391 A1 | 11/2005 |

* cited by examiner

FIG.3
(A)
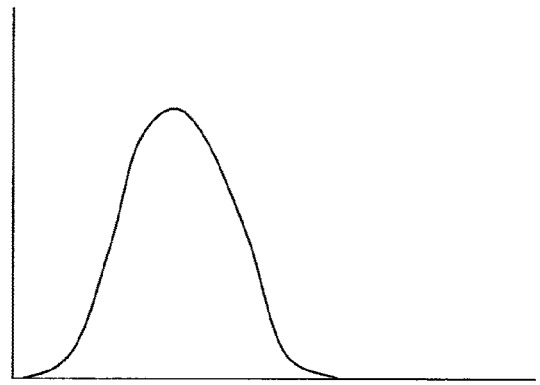
(B)
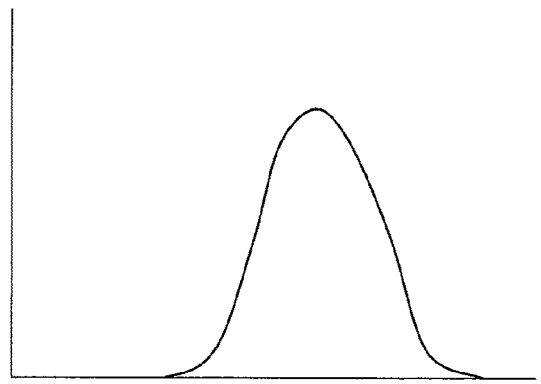
(C)
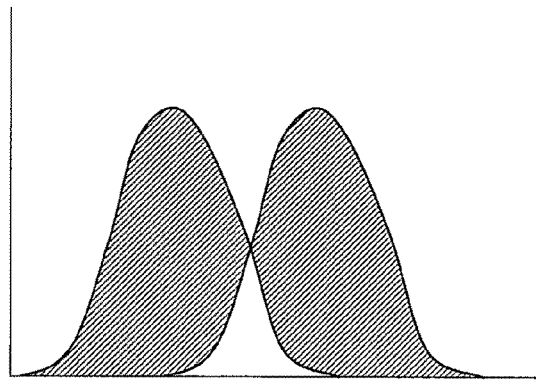

FIG.11
(A)
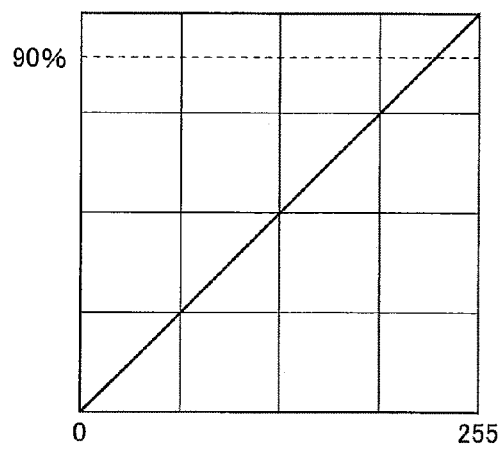
(C)
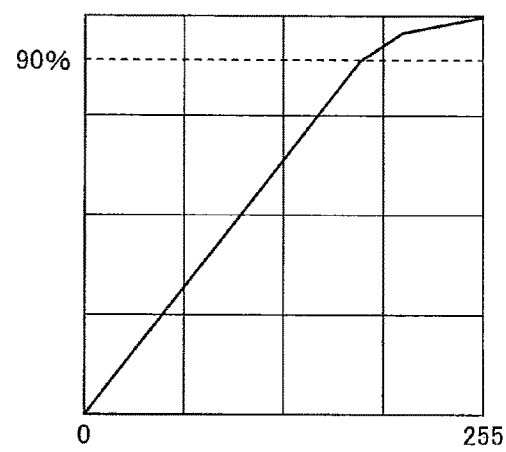
(B)
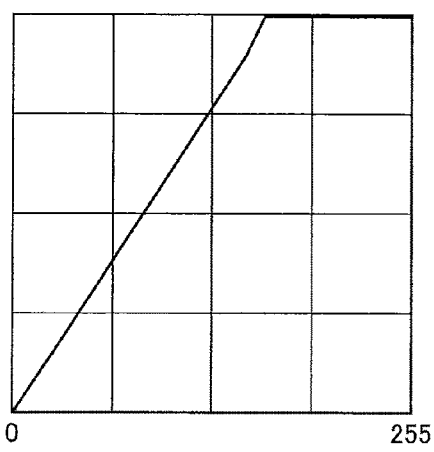
(D)
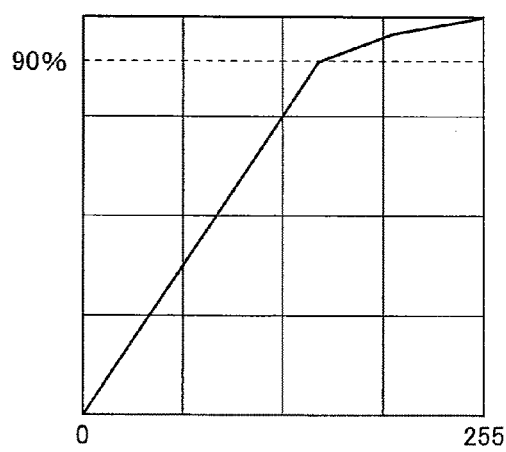

FIG.13
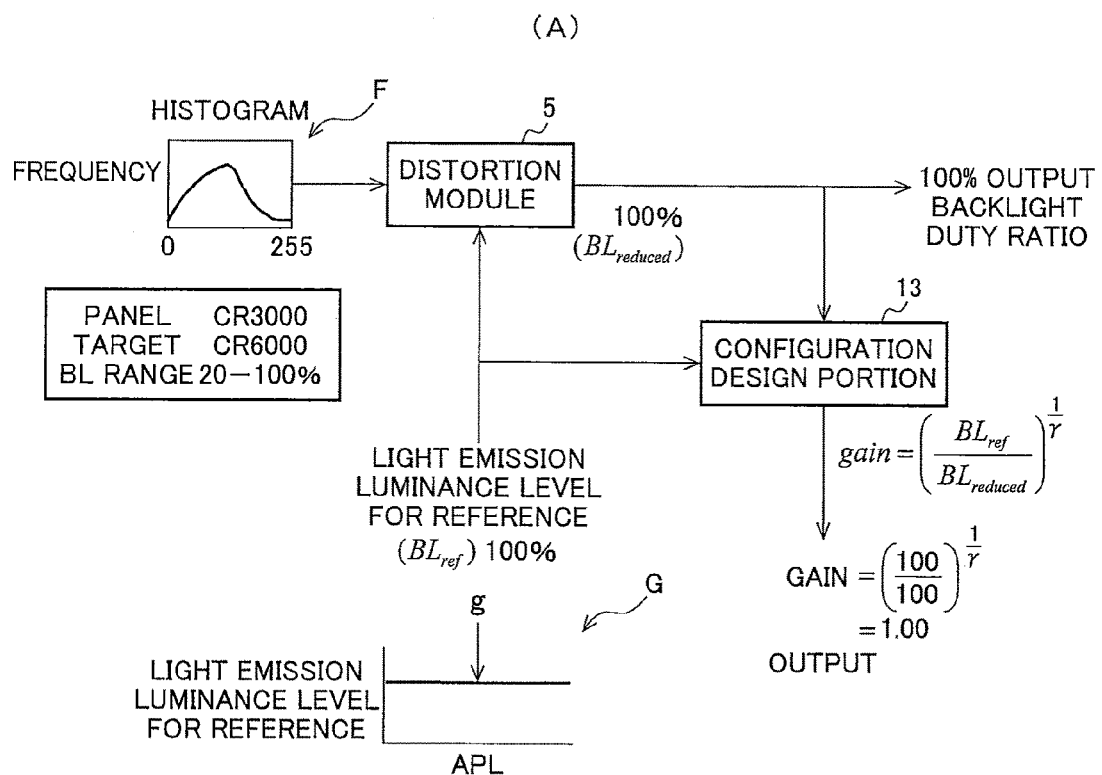
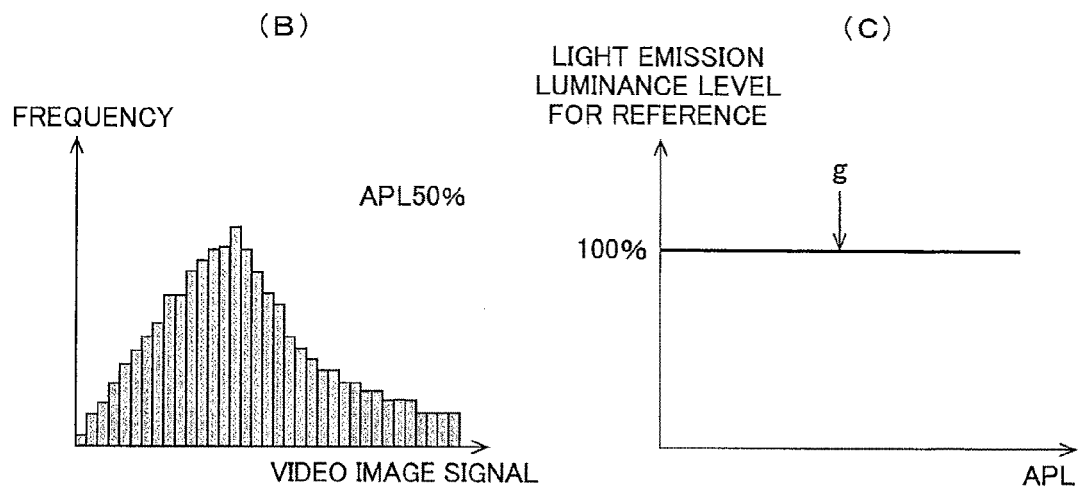

FIG.14
(A)
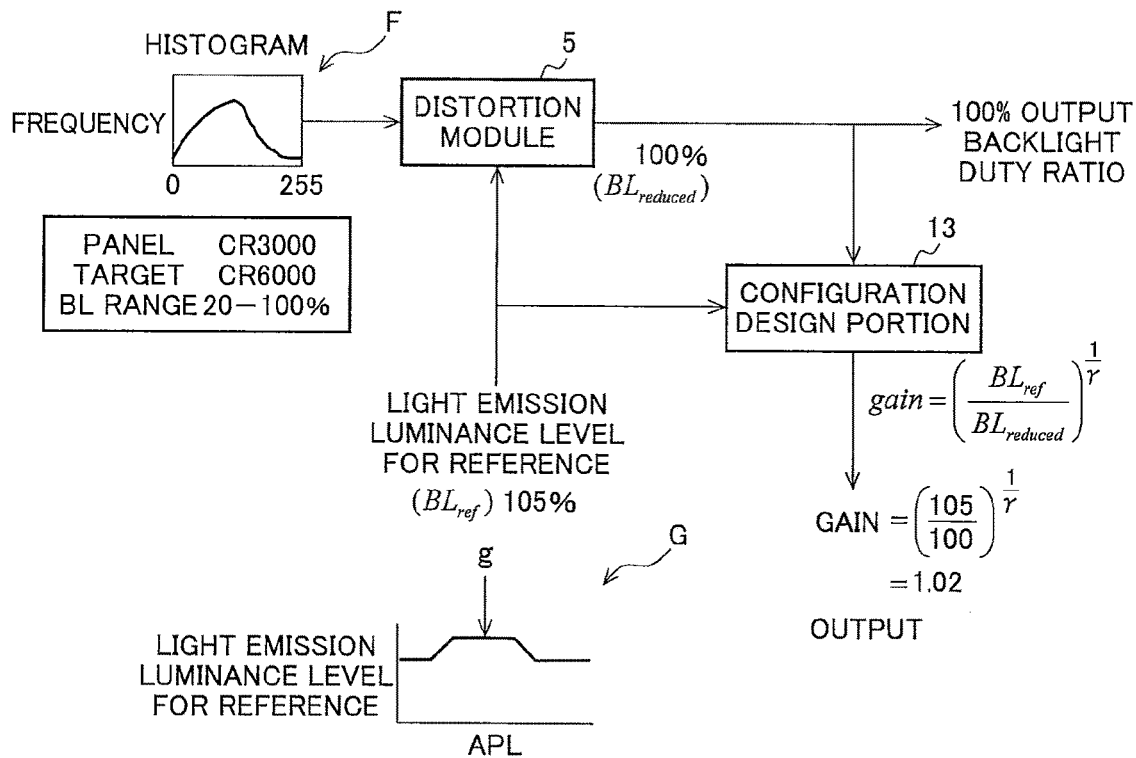
(B)
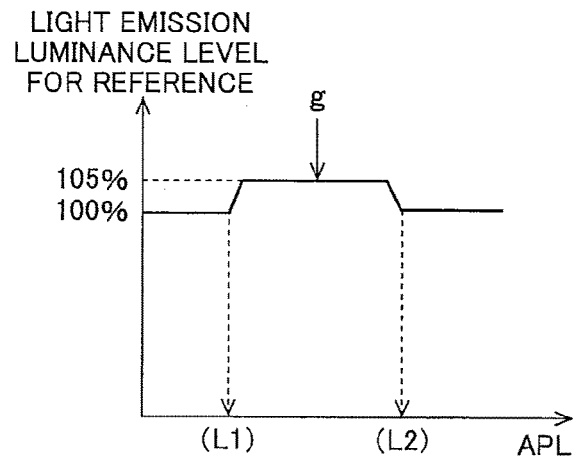

FIG.15
(A)
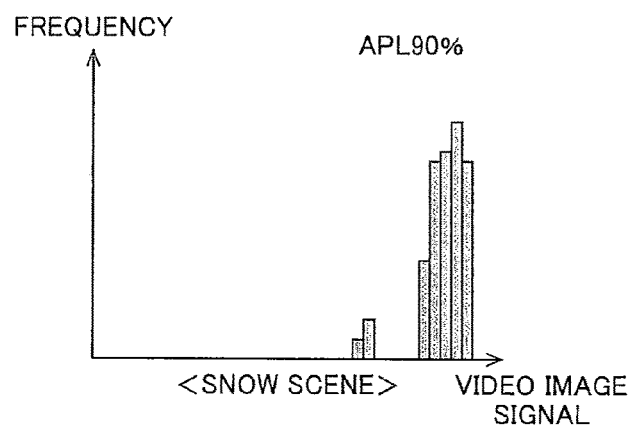
(B)
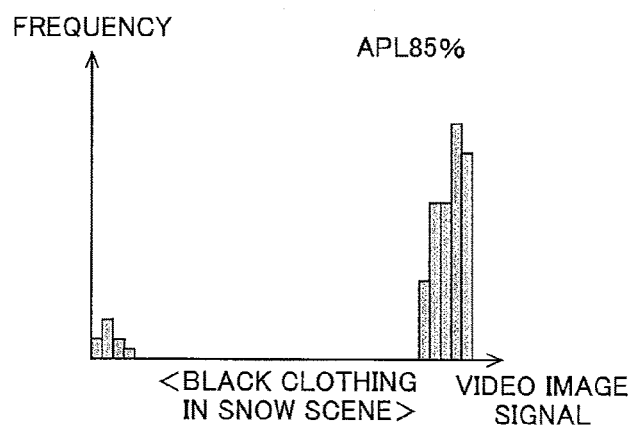
(C)
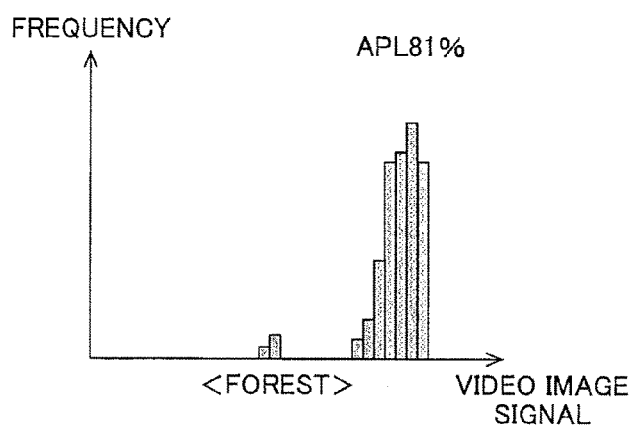

FIG.16
(A)
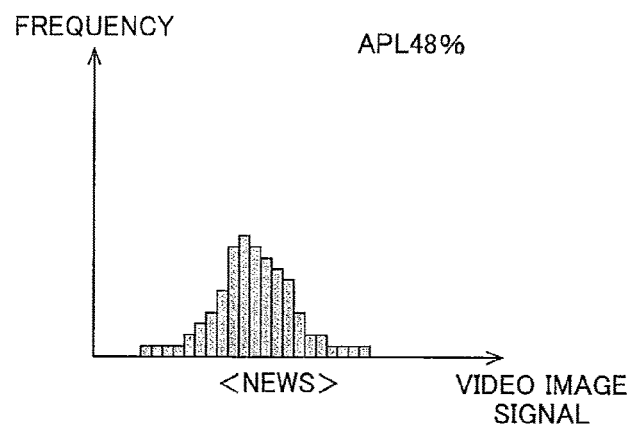
(B)
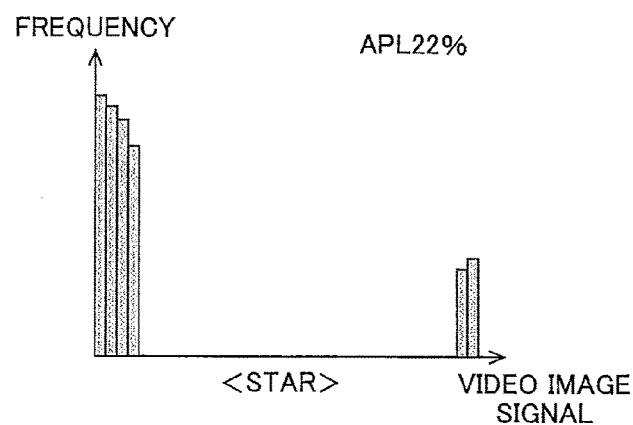
(C)
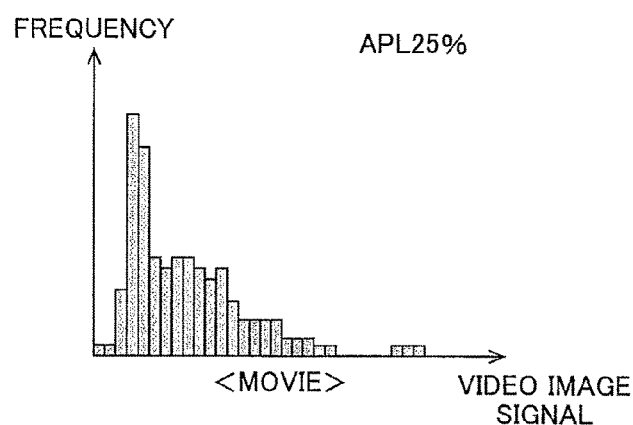

VIDEO DISPLAY APPARATUS FOR ADJUSTING THE DEGREE OF AMPLIFICATION OF THE INPUT IMAGE ACCORDING TO IMAGE CHARACTERISTICS

TECHNICAL FIELD

The present invention relates to a video image display apparatus for expressing a desired display video image.

BACKGROUND OF THE INVENTION

Conventionally, various video image expressions such as gain adjustment of a video image signal and enhancement of a contrast are tried (for example, Patent Document 1).

When a powerful video image expression is tried, processing for enhancing screen luminance is given because a brightness feeling of a screen is required. In this point, Patent Document 2 describes that, conventionally, a video image display is performed by increasing a gain for a pixel that is in a low to intermediate region of gamma correction properties for making a brightness feeling of a display video image and by decreasing a gain for a high region pixel to prevent saturation in a bright pixel at the same time.

Meanwhile, such gain control has a problem that a gain becomes smaller and luminance becomes lower in most pixels for a totally bright video image, and therefore the gain control is not applied uniformly to all input video images but control being different for each of video image properties is tried to be applied.

Patent Document 3 describes one of these techniques. In this document, after the amplitude peak in RGB signals of input video image signals is detected, in a gamma circuit for a video image signal without containing a high peak component, processing for small amplification of a signal in a high region is performed along with linear amplification of a signal in or below an intermediate region of brightness (gamma properties are shown in (b) of FIG. 23), and for a video image signal containing a high peak component, a video image signal is output as it is after releasing a gamma operation (gamma properties are shown in (a) of FIG. 23) to prevent clipped whites (blown out highlights) at the time of large amplitude.

Additionally, in Patent Documents 4 and 5, an average luminance (hereinafter, referred to as "APL") of an input video image signal is detected and the lower the detected APL, the greater an amplification degree of a signal in or below an intermediate region of brightness is made. (in FIG. 24, the lower APL makes gain control in order of (b)→(c)→(d)), while when the APL is higher than a certain value, a video image signal is output as it is without performing the gain control ((a) in FIG. 24) to prevent saturation on the white side.

In the above Patent Documents 3 to 5, an operation is such that when a video image characteristic amount meets predetermined conditions, an input signal is amplified all the time and when a video image characteristic amount does not meet predetermined conditions, an input signal is not amplified all the time.

That is, in Patent Document 3, when an APL as a video image characteristic amount meets conditions that the amplitude peaks of RGB signals don't contain a high peak component, a signal is amplified all the time and in the case of not meeting the conditions (in the case where the amplified peaks of RGB signals contain a high peak component), a video image signal is not amplified all the time.

Similarly, in Patent Documents 4 and 5, in the case of meeting conditions that an APL as a video image characteristic amount is a certain level or lower, an amplification degree of a signal with brightness being an intermediate value or less (certain luminance value or less) is increased in proportion to a low level of an APL (amplifying all the time) and in the case of not meeting conditions that an APL is a certain level or lower (in the case where a APL is higher than a certain value), the gain control is not performed and a video image signal is not amplified.

As described above, a video image characteristic amount such as a peak of an input video image signal and an APL is detected to control a gain of an input video image signal depending on the detected result and thereby not only clipped whites are prevented but also a higher contrast is attempted, while there may be also a preferable case that a video image signal with a luminance that is a certain level or lower is boosted to make a brightness feeling, for example, when a dark video image signal is contained at a little bit high rate even in the case of not meeting conditions that an APL is a certain level or lower because whether or not amplification processing of a video image signal is performed is determined depending on specific conditions that a video image characteristic amount meets.

Additionally, there is also a case that amplification of a video image signal may be better to be prevented from performing in consideration of decreasing luminance in a high luminance part in a case where a pixel with high luminance is contained at a little bit high rate such as a case of giving priority to prevention of saturation on the white side, even when an APL is significantly low.

Furthermore, for a video image having a small level of a peak and an APL, deepness of a black level may be sacrificed at any cost because processing for boosting a video image signal with a brightness that is an intermediate value or lower is performed.

Since the video image expression is performed by performing light modulation of light source luminance in addition to processing of a video image signal in a video image display apparatus such as a liquid crystal display apparatus that displays a video image by irradiating light from the back side of a display screen, more complicated video image expressions are allowed with an appropriate combination thereof.

Patent Documents 6 to 9 describe a liquid crystal display apparatus enriching the video image expression especially on the black side by attempting to combine processing of a video image signal with light modulation of light source luminance.

In these Documents, it is described that the luminance of a light source is lowered to provide deepness of a black level not being capable of the expression only with a normal video image display and a video image signal is amplified to prevent from lowering a luminance level of the whole video image.

Describing in more detail about Patent Document 6, after a histogram of an input video image signal is analyzed to select luminance of a light source capable of the best expressing histogram thereof, a video image signal is amplified to compensate the lowered luminance in a case where the light source is lowered. Such amplification rate is calculated by a formula of (light source luminance at a maximum light emission/light source luminance in the case of being lowered)$^{1/\gamma}$, which allows a video image signal to be amplified in a case where a light source is lowered.

As such, technology described in Patent Documents 6 to 9 provides processing of which the luminance of a light source at a maximum light emission does not allow a video image signal to be amplified and the lowered luminance of a light source allows a video image signal to be amplified. That is, there is also a case that a video image signal is not or is amplified despite conditions of a video image characteristic amount of a video image signal.

Additionally, Patent Document 10 describes that an APL and a maximum/minimum value of an input video image signal is detected to enlarge an input video image signal to a dynamic range and the luminance at the time of display of video images deviated by enlarging a video image signal is compensated by adjusting light emission luminance of a light source.

It can be described by a technology of the patent document that a video image signal is not amplified all the time in the case of meeting conditions in which maximum luminance and minimum luminance as a video image characteristic amount of an input video image signal correspond with a dynamic range and a video image signal is amplified all the time in the case of not meeting a condition in which maximum luminance and minimum luminance correspond with a dynamic range (in a case where maximum luminance and minimum luminance do not correspond with a dynamic range).

Additionally, a rate emphasizing the above black level, a rate emphasizing the white, the opposite thereof, a degree emphasizing power saving and the like do not have all video images at the same degree of emphasis but have different situations depending on respective video image characteristics. Regarding this point, for example, in Patent Document 11, light source luminance control properties of a liquid crystal display are changed to achieve to obtain the desired display luminance and to lower power consumption according to an image quality mode such as a dynamic mode, a normal mode, a movie mode and a game mode. Furthermore, in Patent Document 12, a mode that indicates to which a priority is given, the image quality or power saving, is provided to change the degree of emphasis of power saving for backlight according to this mode.

[Patent Document 1] Japanese Laid-Open Patent Publication No. 6-62277
[Patent Document 2] Japanese Laid-Open Patent Publication No. 2006-101363
[Patent Document 3] Japanese Laid-Open Patent Publication No. 6-350874
[Patent Document 4] Japanese Laid-Open Patent Publication No. 2003-167544
[Patent Document 5] Japanese Laid-Open Patent Publication No. 2003-309741
[Patent Document 6] US 2006/0274026
[Patent Document 7] Japanese Laid-Open Patent Publication No. 2006-276677
[Patent Document 8] Japanese Laid-Open Patent Publication No. 2006-267995
[Patent Document 9] Japanese Laid-Open Patent Publication No. 2007-36728
[Patent Document 10] Japanese Laid-Open Patent Publication No. 2001-27890
[Patent Document 11] Japanese Laid-Open Patent Publication No. 2007-140436
[Patent Document 12] Japanese Laid-Open Patent Publication No. 2007-219477

DISCLOSURE OF THE INVENTION

Problems to be Solved by the Invention

As described above, a powerful video image expression appealing a brightness feeling is required, while depending on display video images, for example, performing a video image expression having deepness of a black level is contradictorily desired when a totally dark video image such as a movie is displayed.

The present invention has been made in view of the above circumstances, and an object thereof is to provide a video image display apparatus that prevents clipped whites or allows an expression of a brightness feeling for which clipped whites is controlled not to be conspicuous while performs a video image expression with an improved black level.

Means for Solving the Problems

In order to solve the above problem, a first technical means of the present invention is a video image display apparatus that adjusts an amplification degree of the input video image signal in accordance with a video image characteristic amount of an input video image signal, wherein the input video image signal is amplified all the time in a case where the video image characteristic amount meets predetermined conditions, but the input video image signal is or is not amplified in a case where the video image characteristic amount does not meet the predetermined conditions.

A second technical means of the present invention is the video image display apparatus as defined in the first technical means, wherein the video image characteristic amount is average luminance of an input video image signal, and the predetermined condition is that average luminance of the input video image is a predetermined value or less.

A third technical means of the present invention is the video image display apparatus as defined in the first technical means, wherein the video image characteristic amount is average luminance of an input video image signal, and the predetermined condition is that average luminance of the input video image is a first value or more and a second value or less.

A fourth technical means of the present invention is the video image display apparatus as defined in the first technical means, wherein the video image characteristic amount is a frequency that can not be expressed, in the case of expansion, out of input video image signals, and the predetermined condition is that the frequency is a predetermined rate or less.

A fifth technical means of the present invention is the video image display apparatus as defined in the first technical means, wherein the video image characteristic amount is average luminance of input video image signals and a frequency that can not be expressed, in the case of expansion, out of input signals, and the predetermined conditions are that the average luminance is a predetermined value or less and the frequency is a predetermined rate or less.

A sixth technical means of the present invention is the video image display apparatus as defined in the first technical means, wherein the video image characteristic amount is a frequency that can not be expressed, in the case of expansion, out of average luminance of input video image signals and input signals, and the predetermined conditions are that average luminance of the input video image is a first value or more and a second value or less and additionally the average luminance is a predetermined value or less and the frequency is a predetermined rate or less.

A seventh technical means of the present invention is the video image display apparatus as defined in the first technical means, wherein the video image characteristic amount is the maximum luminance and the minimum luminance of an input video image signal, and the predetermined conditions are that the minimum luminance of the input video image signal is a first value or more and the maximum luminance of the input video image signal is a second value or less.

A eighth technical means of the present invention is the video image display apparatus as defined in any one of the first through the seventh technical means, which includes a display portion and a light source, inputs the video image signal to the display portion and irradiates a light from the light source on the display portion to display a video image.

A ninth technical means of the present invention is the video image display apparatus as defined in the eighth technical means, wherein in a case where the video image characteristic amount does not meet predetermined conditions, the input video image signal is not amplified when the light source luminance is the maximum luminance, and the input video image signal is amplified when the light source luminance is lowered from the maximum luminance.

A tenth technical means of the present invention is the video image display apparatus as defined in the eighth technical means, wherein the amplification degree of a video image signal is determined based on light emission luminance of the light source.

A eleventh technical means of the present invention is the video image display apparatus as defined in the tenth technical means, wherein the amplification degree of a video image signal, at the time when light emission luminance of the light source is at maximum, is set to be a value greater than a value capable of appropriately displaying an input video image signal of maximum luminance.

A twelfth technical means of the present invention is the video image display apparatus as defined in the tenth technical means, wherein the amplification degree of a video image signal is determined also considering a targeted light emission luminance value of the light source.

A thirteenth technical means of the present invention is the video image display apparatus as defined in the twelfth technical means, wherein the targeted light emission luminance value of the light source is set to be a value greater than 100%.

A fourteenth technical means of the present invention is the video image display apparatus as defined in the first technical means, wherein the predetermined conditions are changed in accordance with an image quality mode.

A fifteenth technical means of the present invention is the video image display apparatus as defined in any one of the second or the fifth technical means, wherein the predetermined value is changed in accordance with an image quality mode.

A sixteenth technical means of the present invention is the video image display apparatus as defined in any one of the third, the sixth or the seventh technical means, wherein the first value and/or second value are/is changed in accordance with an image quality mode.

A seventeenth technical means of the present invention is the video image display apparatus as defined in any one of the fourth through the sixth technical means, wherein the predetermined rate is changed in accordance with an image quality mode.

Effect of the Invention

According to the present invention, performing the processing which boosts a signal having a luminance value that is a certain level or lower all the time allows a further brightness feeling to be appealed in a case where a video image characteristic amount meets predetermined conditions, while deepness of a black level can be expressed considering clipped whites in the case where the video image characteristic amount does not meet the predetermined conditions.

BRIEF DESCRIPTION OF THE DRAWINGS

FIG. 3 is a diagram for explaining a histogram of a video image signal and transition thereof;

FIG. 11 is a diagram showing an example of a gain that is set by an $RGB_\gamma$/WB adjustment portion in the video image display apparatus of FIG. 2;

FIG. 13 is a diagram for explaining an operation example of normal advanced luminance modulation in which a light emission luminance level for reference is set in a range of 100% or less;

FIG. 14 is a diagram for explaining an example of advanced luminance modulation processing applicable to a video image display apparatus of the present invention;

FIG. 15 is a diagram showing an example of a histogram of a video image signal;

FIG. 16 is a diagram showing other examples of a histogram of a video image signal;

EXPLANATION OF REFERENCE NUMERALS

1 . . . scaling portion, 2 . . . Y-histogram portion, 3 . . . APL detection portion, 4 . . . histogram stretching portion, 5 . . . distortion module, 6 . . . scene change detection portion, 7 . . . temporary filter, 8 . . . BL luminance level setting portion, 9 . . . temporary filter, 10 . . . variable delay, 11 . . . CPLD, 12 . . . BL adjustment portion, 13 . . . configuration design portion, 14 . . . image quality correction portion, 15 . . . WB adjustment portion, 16 . . . FRC portion, 17 . . . video image output portion, 20 . . . advanced luminance modulation portion, 61 . . . histogram buffer, 62 . . . histogram change detection portion.

PREFERRED EMBODIMENT OF THE INVENTION

In the present invention, a degree of amplification of an input video image signal is adjusted in accordance with a video image characteristic amount of the input video image signal. In the embodiment according to the present invention which will be described below, in a video image display apparatus provided with backlight as a light source, a degree of amplification (gain) of an input video image signal is adjusted in accordance with a video image characteristic amount of an input video image signal, and at this time, a contrast to be targeted (target CR) is set and a video image expression is performed to be close to the target CR by a control of light emission luminance of the backlight and a control of a gain. Such luminance modulation processing of the video image signal and the backlight is advanced luminance modulation processing in this specification.

<Outline of Advanced Luminance Modulation Processing>

For display luminance when displaying a video image, it is ideal to reproduce faithfully a level of a video image signal to be displayed. That is, when displaying a black screen, the display luminance should be 0 ideally. In the case of a video image display apparatus using a liquid crystal panel and a backlight light source, in reality, there is a slight light leakage in the liquid crystal panel, and when displaying the black screen, a display in gray not black is performed.

As one of important performances of the video image display apparatus, there is a contrast ratio (hereinafter, also referred to as CR). In the video image display apparatus, CR is a ratio of the maximum luminance to the minimum luminance on the liquid crystal panel. In the case of the video image display apparatus using the liquid crystal panel and the backlight light source, the maximum luminance is determined by the maximum light emission luminance of the backlight light source and the minimum luminance is determined by a light leakage amount in displaying black. Thus, when the light emission luminance of the backlight light source is constant, in a same liquid crystal panel, the contrast ratio is constant.

Figure 1:
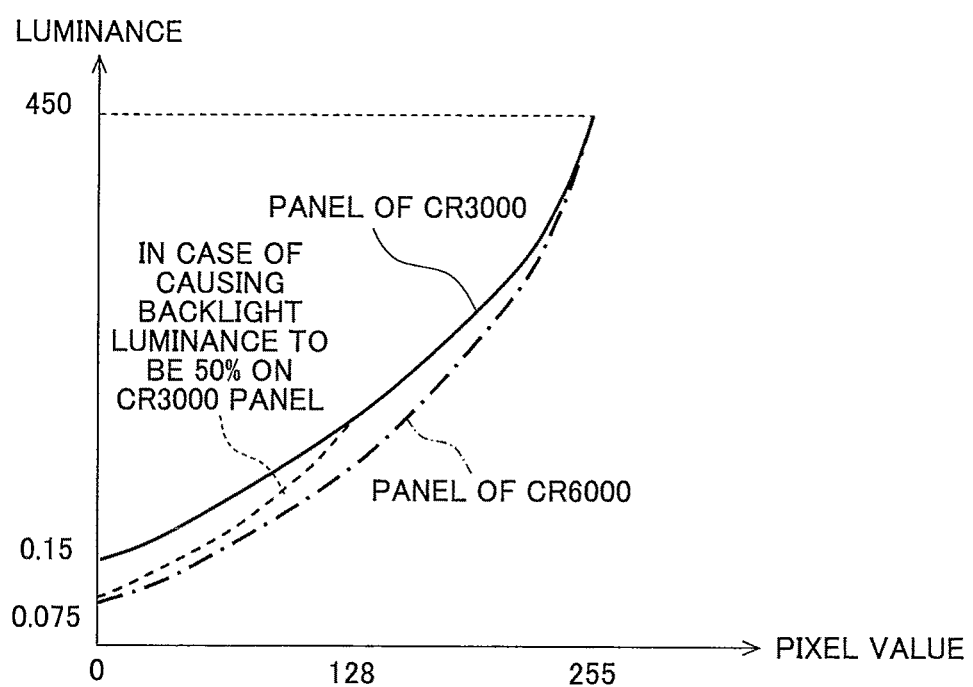
FIG. 1 is a diagram for explaining a relation between an input video image signal and a luminance value on a liquid crystal panel.

FIG. 1 is a graph showing a relation between a pixel value of an input video image signal (a luminance value of a video image signal) and a luminance value on a liquid crystal display concerning a liquid crystal panel in which the CR is 3000 and 6000. Both of the maximum luminance values are the same, 450 cd, however, the display luminance (minimum luminance) on the liquid crystal display at the pixel value 0 is 0.15 cd in the case of CR 3000, 0.075 cd in the case of CR 6000, there is a twofold difference.

For example, in using the liquid crystal panel of CR 3000, when the light emission luminance of the light source is lowered to 50%, the relation between the pixel value of the input video image signal and the luminance value of the liquid crystal panel is a relation as shown by a dotted line in FIG. 1. Since the light emission luminance of the light source is 50%, a video image larger than the pixel value 128 can not be displayed. However, concerning the pixel values 0 to 128, a luminance expression close to the liquid crystal panel of CR 6000 is possible.

Therefore, when the maximum value of the pixel value included in a video image is 128 or less, a contrast feeling equivalent to the liquid crystal panel of CR 6000 can be obtained by making the light emission luminance of the light source to be 50%, and luminance expression performance equivalent to the liquid crystal panel of CR 6000 can be obtained by expanding the pixel value of the video image signal by twice. Such expansion can be realized by setting a gain which increases the pixel value of the video image signal by twice. Additionally, since not only the CR is improved, but also the light emission luminance of the backlight light source is lowered to be 50%, power saving can be realized. Note that, in the above-described example, since the maximum value of the pixel value is 128 or less, clipped whites are not occurred by simply increasing pixel value by twice.

Advanced luminance modulation processing compensates a lowered amount of the light emission luminance of the backlight light source with an output value of a video image signal to the liquid crystal panel, like in this example, by suppressing the light emission luminance of the backlight light source to be close to the targeted CR (target CR) and by realizing the power saving at the same time, and together with that by setting a gain of a video image signal and expanding the video image signal using the gain setting. Except the example above, for example, when a white part in a video image is extremely little, a degree of emphasizing the white part is lowered, and the black expression can be improved similarly. At this time, the clipped whites in a part which are not emphasized is possible to be neglected, or a gain in a white side region may be determined so that the clipped whites are alleviated even by the gain setting that realizes the target CR.

Furthermore, in the advanced luminance modulation processing, the processing for suppressing a light emission luminance level of a backlight light source dynamically in accordance with a video image characteristic amount of an APL, etc., of a video image obtained by the video image signal is executed to realize the power saving at the same time as described below.

That is, the power saving is realized by firstly setting a light emission luminance level for reference used for a gain setting and for setting a light emission luminance level of a backlight light source in accordance with a video image characteristic amount (histogram information such as an APL, a peak (maximum luminance value), and the like), and CR is improved and further power saving is realized, further, by performing the processing for obtaining a contrast feeling described above (that is, to set the light emission luminance level in an appropriate value that is equivalent to or less than the light emission luminance level for reference) to the light emission luminance level for reference, and the visual luminance is maintained by setting a gain of the video image signal linking to the processing for obtaining a contrast feeling described above.

<System Structural Example of a Video Image Display Apparatus in which Advanced Luminance Modulation Processing is Performed>

Figure 2:
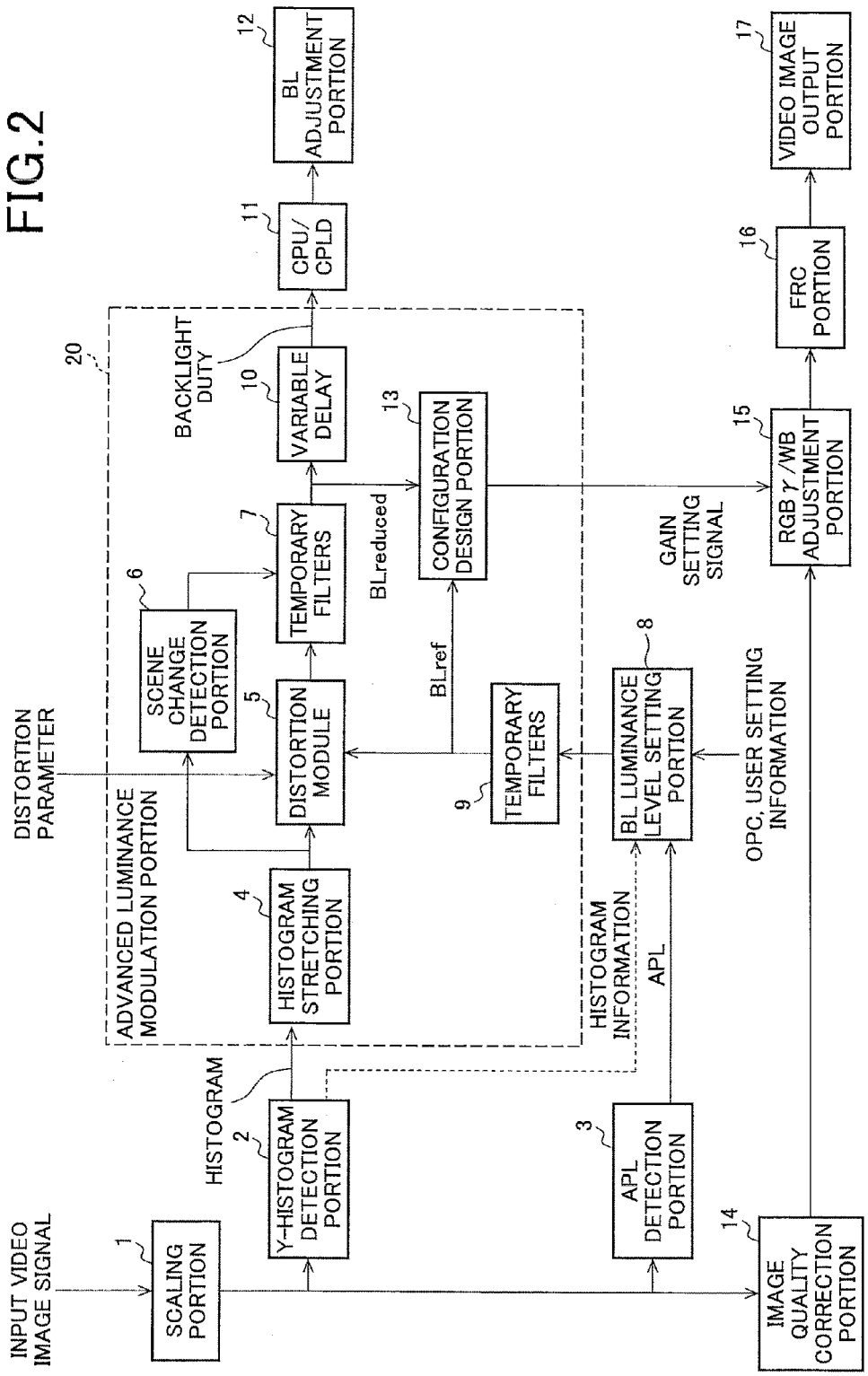
FIG. 2 is a block diagram showing a structural example of a system concerning an embodiment of a video image display apparatus according to the present invention.

FIG. 2 is a block diagram showing a structural example of a system by an embodiment of a video image display apparatus according to the present invention. The video image display apparatus illustrated in FIG. 2 is provided with a scaling portion 1, a Y-histogram detection portion 2, an APL detection portion 3, a BL (backlight) luminance level setting portion 8, a CPU (Central Processing Unit)/CPLD (Complex Programmable Logic Device) 11, BL light modulation portion 12, an image quality correction portion 14, an RGBγ/WB (White Balance) adjustment portion 15, a FRC (Frame Rate Control) portion 16, and a video image output portion 17.

The video image display apparatus illustrated in FIG. 2 is provided with an advanced luminance modulation portion 20 that executes a main part of the advanced luminance modulation processing. The advanced luminance modulation portion 20 has a histogram stretching portion 4, a distortion module 5, a scene change detection portion 6, a first temporary filter 7, a second temporary filter 9, a variable delay 10, and a configuration design portion 13. Note that, as described above, the advanced luminance modulation processing is progressed luminance modulation processing which not only controls dynamic light emission luminance of a light source in accordance with the video image characteristic amount of the APL, etc., but also selects a light emission luminance level $BL_{reduced}$ to obtain a further contrast feeling for a light emission luminance level for reference $BL_{ref}$ of the light source which is determined by predetermined conditions of the video image characteristic amount, and sets a gain of a video image signal.

First, description will be given for an outline of each block in a video image display apparatus of FIG. 2.

The video image output portion 17 outputs and displays a video image signal to be displayed. In this example, a liquid crystal panel is used as a display panel to perform a video image display. Accordingly, the video image output portion 17 has a liquid crystal panel for displaying a video image by a video image signal and a liquid crystal control circuit that converts the video image signal to a signal for driving the liquid crystal panel and outputs the video image signal to the liquid crystal panel. Although the detail thereof will be described below, the video image signal is input to the video image output portion 17 after being converted by using a gain that is set by the advanced luminance modulation portion 20. That is, in the advanced luminance modulation processing, a video image signal showing a video image to be displayed by the video image output portion 17 is an object for processing. The gain and the setting thereof will be described below.

The BL adjustment portion 12 has a lamp comprised of a fluorescent tube, and a lamp driving circuit that drives the lamp, and configures a light source (backlight light source, or simply referred to as backlight) to irradiate the liquid crystal panel of the video image output portion 17 from the back face or a side face. In the advanced luminance modulation processing of this example, the backlight light source is an object for light emission luminance control.

The BL adjustment portion 12 is controlled by the CPU/CPLD 11. The CPU/CPLD 11, according to a signal (for example, a duty signal) showing the light emission luminance level $BL_{reduced}$ that is output from the advanced luminance modulation portion 20, converts to a signal (signal appropriate to drive, for example, pulse width modulation, etc.) for performing light modulation actually in the lamp driving circuit (for example, an inverter circuit) of the BL adjustment portion 12 and outputs to the BL adjustment portion 12. It is to convert the backlight light modulation value to a signal for actual adjustment of the backlight light. Furthermore, as a lamp, for example, one configured by a LED (Light Emitting Diode) or configured by a combination of the LED and a fluorescent tube are employable, and a lamp driving circuit corresponding thereto may be provided at the same time.

Portions to perform processing for a video image signal to be output to the video image output portion 17 and controlling the BL adjustment portion 12 through the CPU/CPLD 11 are the scaling portion 1, the Y-histogram detection portion 2, the APL detection portion 3, the BL luminance level setting portion 8, the image quality correction portion 14, the RGBγ/WB adjustment portion 15, the FRC portion 16, and the advanced luminance modulation portion 20.

First, the scaling portion 1 changes the number of pixels of a video image frame shown by a video image signal that is input (input video image signal) or an aspect ratio of the video image frame by calculation in accordance with the resolution, etc., of the liquid crystal panel.

Here, the input video image signal corresponds to a signal which is a demodulated signal of a video image signal received as broadcast wave, a video image signal received via communication network, a signal read from a video image signal stored in an internal storage apparatus, a video image signal received from an external device such as various recorders, various players, tuner devices, or the like, alternatively corresponds to video image signals obtained after every kind of video image processing has been applied to the above video image signals. Although not shown, the video image display apparatus of FIG. 2 may be configured to be able to obtain any one of such video image signals.

The image quality correction portion 14 changes a contrast or a color taste, etc., of the video image for the video image signal output from the scaling portion 1 by a user setting, etc.

The RGBγ/WB adjustment portion 15 performs adjustment of γ, WB, etc., of the video image for the video image signal that is output from the image quality correction portion 14. Furthermore, the RGBγ/WB adjustment portion 15 changes a gain of a signal by a gain setting signal from the advanced luminance modulation portion 20 (actually, the configuration design portion 13). Here, the gain for the video image signal that is output from the image quality correction portion 14 is changed or the gain for the video image signal after the γ-adjustment in the RGBγ/WB adjustment portion 15 is changed. Then, in the RGBγ/WB adjustment portion 15, the conversion of the video image signal is applied based on the gain, and a lowered amount of luminance is compensated with the gain for the control that lowers the light emission luminance level in the advanced luminance modulation portion 20 which will be described below. Here, to suppress noise of a low gradation part, the conversion is preferably applied after the γ-adjustment and before the WB adjustment.

The gain setting signal from the advanced luminance modulation portion 20 is a signal showing a conversion coefficient to convert a pixel value of a video image signal (video image signal level) to be output to the above-described liquid crystal panel. The gain setting signal is one common conversion coefficient for multiplying the video image signal (video image signal having a pixel value of 0 to 255 in this example) shown as an example below, and as described below, for a range of a certain video image signal level obtained based on a range of a video image signal level clipped whites by performing a gain, the gain may be corrected by the RGBγ/WB adjustment portion 15.

The FRC portion 16 is a frame rate converter and is the one to convert, for the video image signal that has been adjusted output from the RGBγ/WB adjustment portion 15, from a normal display frequency of 60 Hz to a display frequency of 120 Hz by detecting a motion vector of the video image and generating an interpolation video image. Of course, the display frequency of an object for processing or the display frequency after processing in the FRC portion 16 is not limited thereto. In the example of FIG. 2, the liquid crystal driving circuit of the video image output portion 17 converts the video image signal that is output from the FRC portion 16 to a signal for driving a liquid crystal panel, and output the video image signal to the liquid crystal panel.

The Y-histogram detection portion 2 divides the video image frame into a pixel unit or the like, and generates a histogram representing a generation frequency of a luminance value of each pixel. A histogram generated by the Y-histogram detection portion 2 has a value of a frequency for each of the pixel value (Y) 0 to 255, for example. The APL detection portion 3 calculates an average luminance level of a video image signal for each video image frame. The value calculated by the APL detection portion 3 is a value that shows 0% when an entire screen is black, and shows 100% when an entire screen is white.

The histogram stretching portion 4 sets a range for use in the advanced luminance modulation portion 20 from the histograms generated by the Y-histogram detection portion 2. For example, it is assumed that the distortion module 5 is a module that executes calculation between the minimum value 0 to maximum value 255 and an input video image signal is a signal (for example, a broadcast signal) originally having a value between the minimum value 10 to maximum value 235. In such a case, the histogram stretching portion 4 expands a frequency value for each from the minimum value 10 to maximum value 235 to apply to the frequency value for each from the minimum value 0 to maximum value 255 in order to correspond to the calculation in the distortion module 5.

The distortion module 5 selects (determines) a light emission luminance level (also referred to as a backlight value) $BL_{reduced}$ to be set actually, namely, a light emission luminance level to be used in control of the backlight light source from histograms that is input from the histogram stretching portion 4 and a light emission luminance level for reference (also referred to as a backlight target value) $BL_{ref}$ set by the BL luminance level setting portion 8 which will be described below. The selection is performed within a range that does not exceed the light emission luminance level for reference $BL_{ref}$ set by the BL luminance level setting portion 8 out of the plurality of light emission luminance levels that are determined in advance. Additionally, here, a light emission luminance level $BL_{reduced}$ is selected which is able to realize a displaying of video image closer to the liquid crystal panel having the target CR. A distortion parameter such as a target CR may be set from a not-shown main CPU. Furthermore, when the light emission luminance level $BL_{reduced}$ is determined based on an APL (operation example 6 described below), the distortion module 5 is caused to input an APL detected by the APL detection portion 3.

In the scene change detection portion 6, presence/absence of a scene change is detected by a degree of change between a histogram of a previous frame and a current histogram. For example, an accumulated total value of a frequency change of each luminance value is calculated, and in the case of being greater than a specific value, it is determined that a scene is changed.

The first temporary filter 7 is provided to prevent a feeling of visual discomfort that occurs when the above-described light emission luminance level $BL_{reduced}$ to be actually set, which is selected by the distortion module 5, is drastically changed, and after reducing a change amount of the light emission luminance level $BL_{reduced}$ with respect to time, is output later as a light emission luminance level $BL_{reduced}$ to be actually set. In addition, at the time of a scene change, when a slow change of the light emission luminance level $BL_{reduced}$ is applied, more discomfort feeling is caused, therefore, a value of the first temporary filter 7 is changed by a scene change detection signal by the scene change detection portion 6 to enable a relatively rapid change.

The BL luminance level setting portion 8 determines a maximum value of a light emission luminance level of backlight with reference to an APL value output from the APL detection portion 3 or a video image characteristic amount such as histogram information output from the Y-histogram detection portion 2, and an OPC (Optical Picture Control; also referred to as a brightness sensor) value output from a not-shown main CPU or a user setting value. For example, the video image without feeling glare can be obtained by making the maximum value of the light emission luminance level of backlight a low value when the APL is high. The maximum value of the light emission luminance level of this backlight is a light emission luminance level for reference (backlight target value) $BL_{ref}$ for advanced luminance modulation to be executed in the advanced luminance modulation portion 20. As described above, the APL and histogram information can be used as a video image characteristic amount to determine the light emission luminance level for reference $BL_{ref}$, and the characteristic amount to be used is selected in accordance with the embodiment. The histogram information includes a peak value (maximum luminance value) and a minimum luminance of a video image, or a frequency of a video image that could not be expressed if a video image signal would be expanded.

Note that, since the selection by the distortion module 5 is performed within a range that does not exceed the light emission luminance level for reference $BL_{ref}$ set in the BL luminance level setting portion 8, it is explained that in the BL luminance level setting portion 8, the maximum value of a light emission luminance level of backlight is set as the light emission luminance level for reference $BL_{ref}$. Additionally, in the example of FIG. 2, a light emission luminance level for reference via the second temporary filter 2 is $BL_{ref}$.

The second temporary filter 9 is a filter that has a function equivalent to the first temporary filter 7. Explanation for the outline is that when the APL is drastically changed and the change does not affect the selection by the distortion module 5, a temporal change of a light emission luminance level $BL_{reduced}$ output from the first temporary filter 7 is alleviated. However, a gain is changed and the display luminance on the liquid crystal panel is drastically changed, because a gain setting is calculated based on the light emission luminance level for reference $BL_{ref}$ output from the BL luminance level setting portion 8. For eliminating or alleviating such a drastic change in the display luminance, the second temporary filter 9 is provided.

The variable delay 10 is a delay portion for adjusting the time of outputting a video image from the video image output portion 17 to synchronize the timing of backlight light modulation by the BL adjustment portion 12. As the backlight light modulation, when a light modulation value is determined, after a relatively little processing, backlight luminance control is performed. Contrary to this, a delay occurs in a video image signal, because a lot of processing is performed such as frame rate control in the FRC portion 16 or a conversion to a panel control signal at the liquid crystal control circuit, even after a gain of a video image is determined by advanced luminance modulation and the luminance level of the video image signal is changed. And then, the time difference occurs between the backlight light modulation control and the gain control of a video image, that should be originally performed at the same time and the balance between the backlight and the video image is lost. Therefore, the backlight light modulation is intentionally delayed by the variable delay 10, and the backlight light modulation control and the gain control is adjusted to occur at the same time.

In the configuration design portion 13, a gain of a video image signal is determined based on a light emission luminance level for reference $BL_{ref}$ determined by the BL luminance level setting portion 8 and a light emission luminance level $BL_{reduced}$ selected by the distortion module 5. Note that, in the example of FIG. 2, a level at which each level $BL_{reduced}$ or $BL_{ref}$ respectively has passed through the temporary filters 7 or 9 is used. When the light emission luminance level for reference (backlight target value) $BL_{ref}$ and the selected light emission luminance level (backlight value) $BL_{reduced}$ are the same, the luminance level of the video image signal is not required to be changed, and the gain is 1. Additionally, when the selected light emission luminance level $BL_{reduced}$ is lower than the light emission luminance level for reference $BL_{ref}$ a gain setting is performed toward a direction to which a luminance level of a video image signal is boosted in accordance with the value.

<Detailed Explanation of Main Block for Executing Advanced Luminance Modulation Processing>

As main blocks in the video image display apparatus of FIG. 2, the BL luminance level setting portion 8, the scene change detection portion 6, the first temporary filter 7, the distortion module 5, the configuration design portion 13, the RGBγ/WB adjustment portion 15 are explained in this order.

<<BL Luminance Level Setting Portion 8>>

A control signal based on detection information of a not-shown brightness sensor for measuring brightness of surroundings (illuminance of surroundings) and a control signal based on a user setting for setting the brightness of a liquid crystal panel as well as the APL of a video image signal detected by the APL detection portion 3 are input to the BL luminance level setting portion 8. Furthermore, as a video image characteristic amount, a frequency of a video image which could not be expressed if a video image signal would be expanded, or when information such as the minimum luminance and maximum luminance of the video image signal is used, such information (referred to as histogram information) required per screen unit (frame unit) of a video image signal is input from the histogram detection portion 2. Furthermore, when both of the APL and the histogram information are used, each of information is input to the BL luminance level setting portion 8.

Then, in the BL luminance level setting portion 8, based on these control signals and the video image characteristic amount, the light emission luminance level for reference $BL_{ref}$ is output. Specifically, a method in which alight emission luminance of a backlight light source is dynamically adjusted in accordance with an input video image signal changed per screen unit (frame unit) is applied, and the light emission luminance level obtained thereby is output as the light emission luminance level (backlight target value) for reference $BL_{ref}$.

For generation of the light emission luminance level for reference $BL_{ref}$ a luminance control table (look up table) held in the BL luminance level setting portion 8 is used. The luminance control table is a table for determining a relation of a light emission luminance level of backlight in accordance with a video image characteristic amount (APL, or histogram information, etc.) of an input video image signal, namely, luminance control properties. Then, a plurality of selectable luminance control tables are prepared in advance and held in a table storing memory such as a ROM (Read Only Memory) provided by the BL luminance level setting portion 8.

As the brightness sensor for measuring the brightness of the surroundings of the video image display apparatus, for example, a photodiode is applied. The brightness sensor generates a direct current voltage signal in accordance with a detected surrounding light and outputs the signal to a not-shown main CPU. The main CPU outputs a control signal for selecting a luminance control table according to the direct current voltage signal in accordance with the surrounding light to the BL luminance level setting portion 8.

Furthermore, the main CPU outputs a luminance adjustment coefficient for adjusting the luminance control value of the luminance control table as a control signal based on a user setting for setting the brightness of the liquid crystal panel. The luminance adjustment coefficient is used for performing the brightness setting of an entire screen in accordance with the user operation. For example, a screen brightness adjustment items are set on a menu screen held by the video image display apparatus. A user is able to set an arbitrary screen brightness by operating the setting items. The main CPU recognizes the brightness setting and outputs the luminance adjustment coefficient to the BL luminance level setting portion 8 according to the set brightness.

In the BL luminance level setting portion 8, a luminance control table is selected by specifying a table No. according to the control signal output from the main CPU according to the detection information of the brightness sensor. Alternatively, a luminance control table to be selected may be generated by calculation. Then, by multiplying the luminance conversion value of the selected luminance control table by the luminance adjustment coefficient obtained as the control signal based on the user setting, and by varying the inclination of the luminance control properties of the luminance control table, and finally, a luminance control table used for generating the light emission luminance level for reference $BL_{ref}$ is determined. Then, the BL luminance level setting portion 8 generates and outputs the light emission luminance level for reference $BL_{ref}$ in accordance with the APL output from the APL detection portion 3 and the histogram information output from the histogram detection portion 2 by using the determined luminance control properties of the luminance control table.

The light emission luminance level for reference $BL_{ref}$ this is output from the BL luminance level setting portion 8 in this manner, after being delayed by the action of the first temporary filter 7, is input to the configuration design portion 13, used for calculation of a video image gain, input to the distortion module 5 and used to determine the light emission luminance level $BL_{reduced}$ in accordance with the histogram.

<Scene Change Detection Portion 6>

Figure 4:
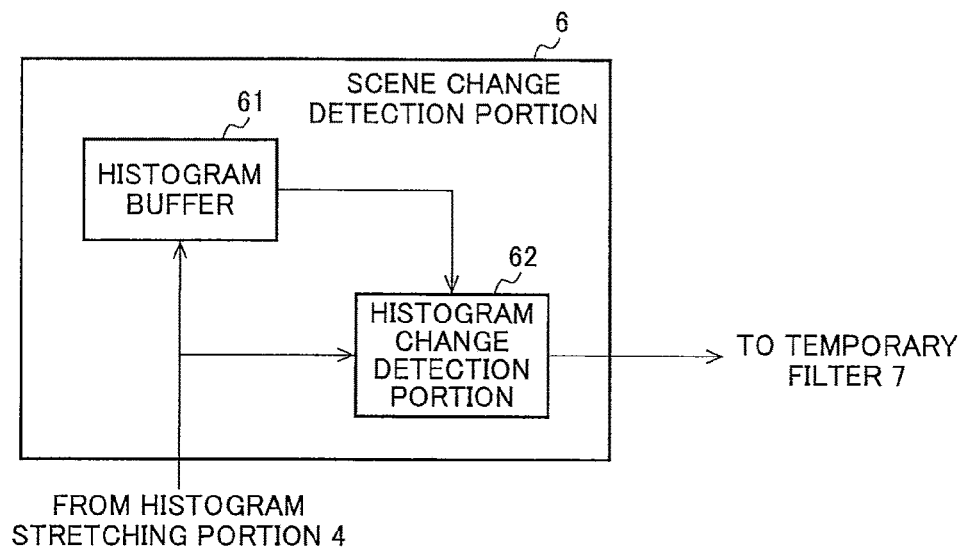
FIG. 4 is a block diagram showing a structural example of a scene change detection portion in the video image display apparatus of FIG. 2.

FIG. 3 is a diagram for explaining a Y-histogram of a video image signal and a transition thereof, FIG. 3 (A) is a diagram showing an example of a Y-histogram of a previous frame, FIG. 3 (B) is a diagram showing an example of a Y-histogram of a current frame subsequent to the FIG. 3 (A), FIG. 3 (C) is a diagram showing a frequency change part by integrating the histogram of each frame shown in FIG. 3 (A) and FIG. 3 (B). FIG. 4 is a block diagram showing a structural example of a scene change detection portion in the video image display apparatus of FIG. 2.

Since contents of the video image are greatly changed when a scene of a video image is changed, it is considered that luminance distribution of the video image signal is also greatly changed. The scene change detection portion 6 detects a scene change by utilizing this, and specifically, detection of presence/absence of a scene change is made by a degree of change between a histogram of a previous frame and a current histogram.

The scene change detection portion 6 has a histogram buffer 61 and a histogram change detection portion 62. The histogram buffer 61 stores the histogram data of a previous frame. The histogram change detection portion 62 compares the histogram data of the current frame with that of the previous frame, and calculates an accumulated total value of a frequency change, and determines as a scene change when the total value is larger than a specific value. When determined as a scene change, the histogram change detection portion 62 outputs the detection signal of a scene change between the frames to the first temporary filter 7.

As a specific example, considering is given to a case where a video image of a previous frame is a histogram such as FIG. 3 (A) and a video image of a current frame is a histogram such as FIG. 3 (B). In this case, the histogram data of FIG. 3 (A) is stored in the histogram buffer 61. The histogram change detection portion 62 compares the data of the histogram buffer 61 with the histogram data of the current frame, and detects the frequency change. The shadowed part in FIG. 3 (C) is a frequency change part. The histogram change detection portion 62 calculates an accumulated value of the frequency change part, in other words, the area, and determines that a scene change is happened when the calculated value is greater than a specific value which is set in advance. Then the histogram change detection portion 62 outputs a scene change detection signal only for a frame determined as a scene change.

<<First Temporary Filter 7>>

Figure 5:
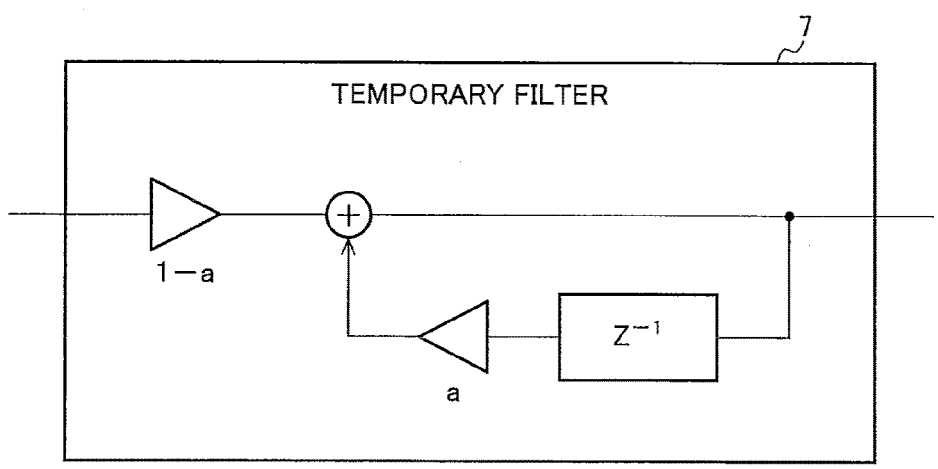
FIG. 5 is a diagram showing a structural example of a first temporary filter of the video image display apparatus of FIG. 2.

FIG. 5 is a diagram showing a structural example of the first temporary filter in the video image display apparatus of FIG. 2. The first temporary filter 7 is a cyclic low-pass filter, and as shown in FIG. 5, a multiplier to multiply a weighting coefficient 1-a by a value Xn of a current frame n to be input, a multiplier to multiply a weighting coefficient a by an output value Yn-1 for a previous frame n-1, and an accumulator to accumulate the outputs from the multipliers, are provided. Here, n is a natural number, a is a coefficient less than 1. Such a configuration of the first temporary filter 7 is represented by the following formula (1).

$$Y_n = aY_{n-1} + (1-a)X_n \quad (1)$$

Although in the advanced luminance modulation processing executed by the advanced luminance modulation portion 20, a light emission luminance level of the backlight light source is dynamically changed, there is a case of causing a discomfort feeling when the light emission luminance level of the backlight is greatly fluctuated on a frame basis. Then the discomfort feeling in the luminance fluctuation of the backlight light source is eliminated, and by passing the light emission luminance level $BL_{reduced}$ determined by the distortion module 5 through a low-pass filter having a time constant of about one second used as the first temporary filter 7.

Since the video image itself is greatly changed at the time of a scene change, there is no discomfort feeling occurred even when the light emission luminance level of the backlight is drastically changed. Thus, at the time of the scene change, the luminance change of the backlight light source is speeded up by making the coefficient a of the first temporary filter 7 small. Specifically, the coefficient a of the formula (1) is made sufficiently small only for the frame in which a scene change is detected, and the value of the coefficient a is returned to an original from the next frame. In this manner, a value close to the input becomes the output of the first temporary filter 7, thus causing the change of the light emission luminance level $BL_{reduced}$ of the backlight light source to be speeded up.

<<Distortion Module 5>>

A basic concept of the advanced luminance modulation processing executed by the advanced luminance modulation portion 20 is that a video image luminance range which is displayable when the light emission luminance level of the backlight light source is 100% in the liquid crystal panel to be used, and a video image luminance range which is displayable in the liquid crystal panel having a CR to be targeted (also referred to as being ideal) (target CR) are set to bring closer to the video image luminance range displayable in the liquid crystal panel having the target CR as a performance by controlling the light emission luminance level of the backlight light source in the liquid crystal panel to be used.

Here, since the light emission luminance level of the backlight light source is lowered, clipped whites are occurred for the high luminance part that can not be expressed fully by a reduced backlight light emission luminance when the video image signal contains a part which is high luminance. In addition, when the video image signal does not contain the low luminance, the light emission luminance level of the backlight need not be lowered.

Therefore, in the distortion module 5, as a determination standard of luminance control of a backlight light source, how much there is a low luminance part or a high luminance part which can not be expressed by a certain light emission luminance level, is quantified as an evaluation value (Distortion). Here, the distortion module 5 performs the quantification within the luminance control range of the backlight light source determined in advance, and is supposed to select a light emission luminance level in which the evaluation value is the smallest as a light emission luminance level $BL_{reduced}$. The luminance control range of the backlight light source is one of distortion parameters and designates a range permitted as a light emission luminance level of a backlight light source. For example, it may be determined in advance by a default setting or a user setting such as, for example, 10% to 100%, 20% to 100%.

Furthermore, in a case where there are a plurality of light emission luminance levels in which the evaluation value is the smallest, the lower light emission luminance level is selected as a light emission luminance level $BL_{reduced}$. Because, in the case of being equivalent as a video image expression quality on the liquid crystal panel, lowering the light emission luminance level of the backlight light source generates energy saving.

Figure 6:
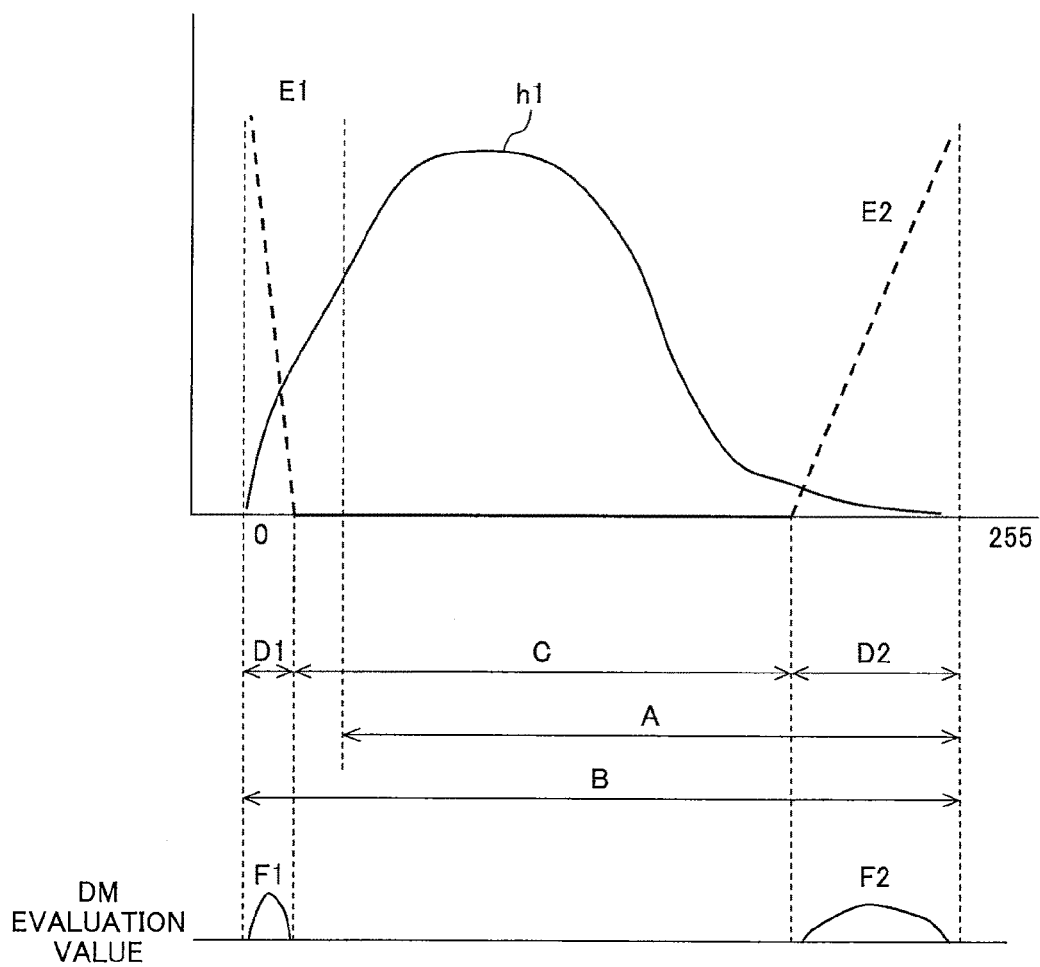
FIG. 6 is a diagram for explaining an example of light emission luminance level selection processing that is performed in a distortion module of the video image display apparatus of FIG. 2.

FIG. 6 is a diagram for explaining an example of light emission luminance level selection processing that is executed in the distortion module of the video image display apparatus of FIG. 2. A symbol h1, shows a Y-histogram of a video image signal. Here, a horizontal axis indicates pixel values (video image signal levels) of a video image signal, and a vertical axis indicates a frequency of each pixel value.

For such a histogram h1 of a video image, a video image luminance range which is displayable when the light emission luminance level of the backlight light source is 100% in a liquid crystal panel to be used is A. Additionally, a video image luminance range which is displayable in a liquid crystal panel of a target CR is B. In addition, among the light emission luminance levels which are selectable by the distortion module 5, a video image luminance range which is displayable by a specific light emission luminance level is C. Then, in the histogram h1, parts that are on both sides of the video image luminance range C and overlap the video image luminance range B are the parts that are objects to which above-described quantification is performed, and are the parts of evaluation value calculation. Among the evaluation value calculation parts, a low luminance part is D1, and a high luminance part is D2.

The evaluation value (Distortion) is calculated by the following formula (2) with the frequency and weighting for a selectable light emission luminance level.

$$\text{Distortion} = \Sigma\{(\text{video image luminance range } D1 + \text{frequency of } D2) \times (\text{distant weight})\} \quad (2)$$

As a weight, the distant weight is used that becomes greater as going farther away from the video image luminance range C which is displayable at a light emission luminance level to be an object of the evaluation value calculation. Here, the distant weight of the low luminance part D1 is E1, the distant weight of the high luminance part D2 is E2. Accordingly, even for the same frequency values, the one which is farther away from the range that can be expressed is greater in the evaluation value. This is because the farther away it is from the range that can be expressed, the greater the effect of not being able to express as a video image is. The values calculated with the frequency and the weighting are F1 (low luminance part) and F2 (high luminance part). The evaluation value is a value of sum total of the area (accumulated total) of F1 and F2.

In the distortion module 5, a light emission luminance level corresponding to the video image luminance range C whose evaluation value is the lowest is selected among the evaluation values calculated for each light emission luminance level as a light emission luminance level $BL_{reduced}$ to be output. At this time, in the distortion module 5, a light emission luminance level $BL_{reduced}$ is selected corresponding to the video image luminance range C whose evaluation value is the lowest within a range that does not exceed the light emission luminance level for reference $BL_{ref}$ set by the BL luminance level setting portion 8 and alleviated by the second temporary filter 9.

For such calculation of the evaluation value, it is ideal to be performed for all the selectable light emission luminance levels in the distortion module 5. However, since there is a restriction of processing time or the like, equally dividing the luminance control range of the selectable light emission luminance levels, and for example, calculation may be performed for each approximately 10% of the light emission luminance level.

That is, the evaluation value for each light emission luminance level is calculated by letting a video image luminance range which is displayable at a specific light emission luminance level of the above formula (2) be C, and by applying the selectable light emission luminance level sequentially. Then, the light emission luminance level that has the lowest evaluation value is selected among the calculated evaluation values as a selected light emission luminance level $BL_{reduced}$, and the value is output to the first temporary filter 7 to be used in the light modulation control of the backlight, and is output to the configuration design portion 13 to be used in a setting (calculation) of a video image gain. At this time, when there are a plurality of light emission luminance levels that have the lowest evaluation value, lower light emission luminance level is selected.

Figure 7:
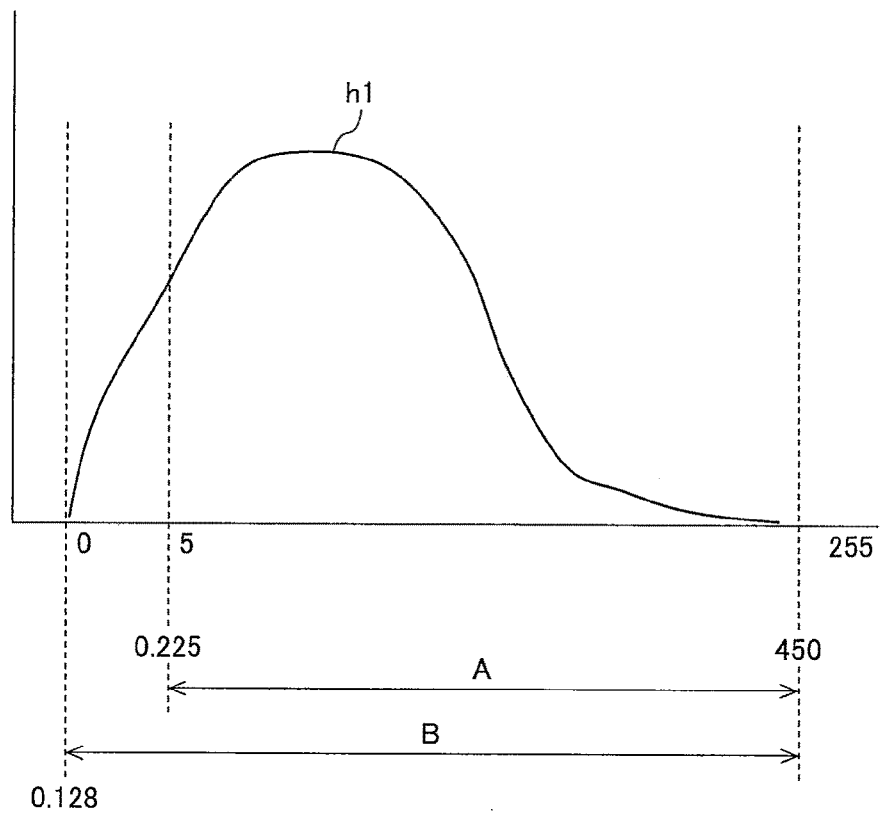
FIG. 7 is a diagram for explaining a specific example of luminance modulation processing in a video image display apparatus according to the present invention.

The selection processing in the distortion module is explained with specific numeric values with reference to FIGS. 7 to 10. FIG. 7 is a diagram for explaining a specific example of luminance modulation processing in the video image display apparatus according to the present invention, and the diagram for showing an example of a relation of a panel CR and a target CR in a video image histogram. Here the CR of a liquid crystal panel (panel CR) to be used is 2000, the target CR is 3500, the luminance control range of the backlight is 20 to 100%, and the maximum luminance of the liquid crystal panel is 450 cd when the backlight luminance is 100%. In addition, each of alphabetical signs conforms to FIG. 6.

In this example, the video image luminance range A which is displayable in the liquid crystal panel to be used is 450 cd to 0.225 cd. Additionally, the video image luminance range B that is displayable in a liquid crystal panel to be targeted is 450 cd to 0.128 cd. Then the frequency for each video image signal level 0 to 255 is allocated to be corresponded to the video image luminance range B. In this case, the difference between the video image luminance range A and the video image luminance range B is about 5 digits (pixel value).

In the histogram h1, when there is a video image in a part of the difference between the video image luminance range B and the video image luminance range A, a luminance expression closer to the target CR becomes possible by lowering the light emission luminance level of the backlight. However, when a video image is also distributed on the high luminance side, a part that can not be expressed by lowering the light emission luminance level of the backlight is generated. Therefore, as described above, an optimum light emission luminance level $BL_{reduced}$ is obtained by calculating the evaluation value.

Figure 8:
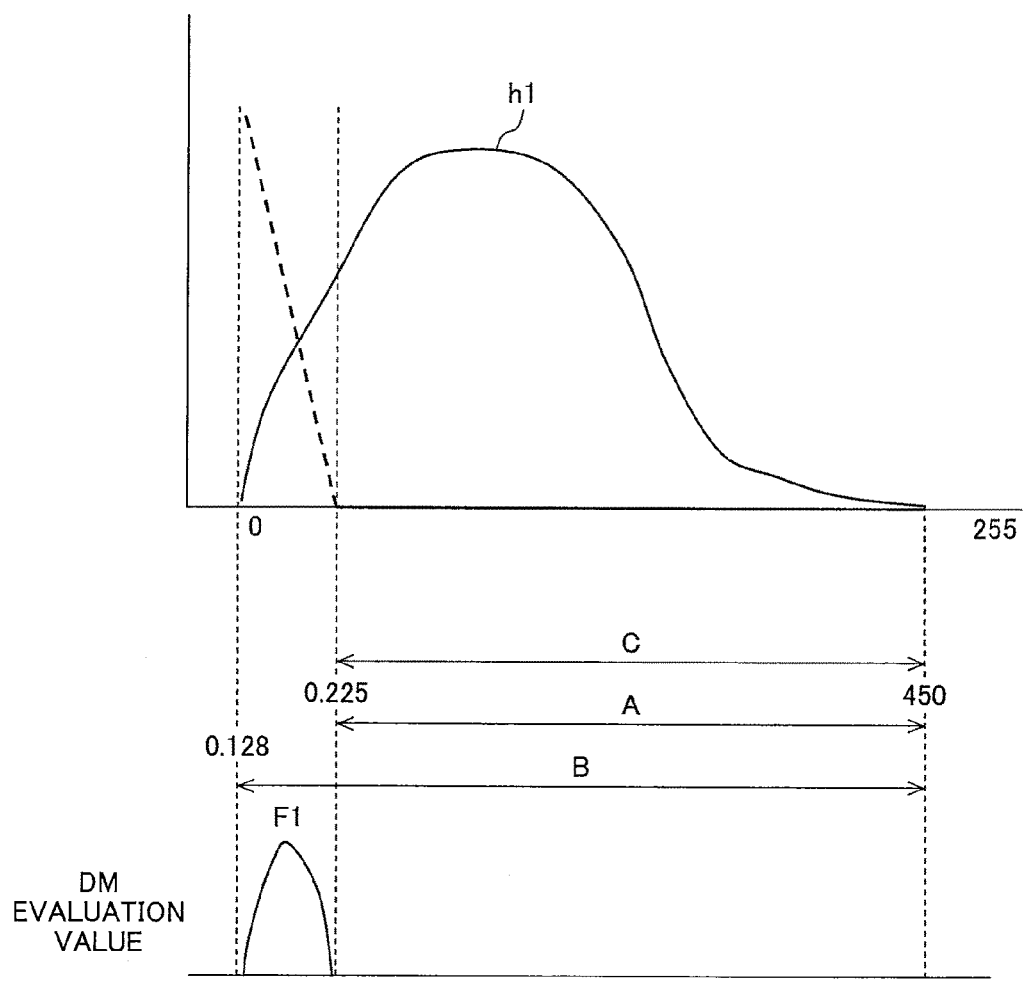
FIG. 8 is a diagram showing a video image luminance range at a 100% light emission luminance level that is one of the objects to be selected in a video image display apparatus.
Figure 9:
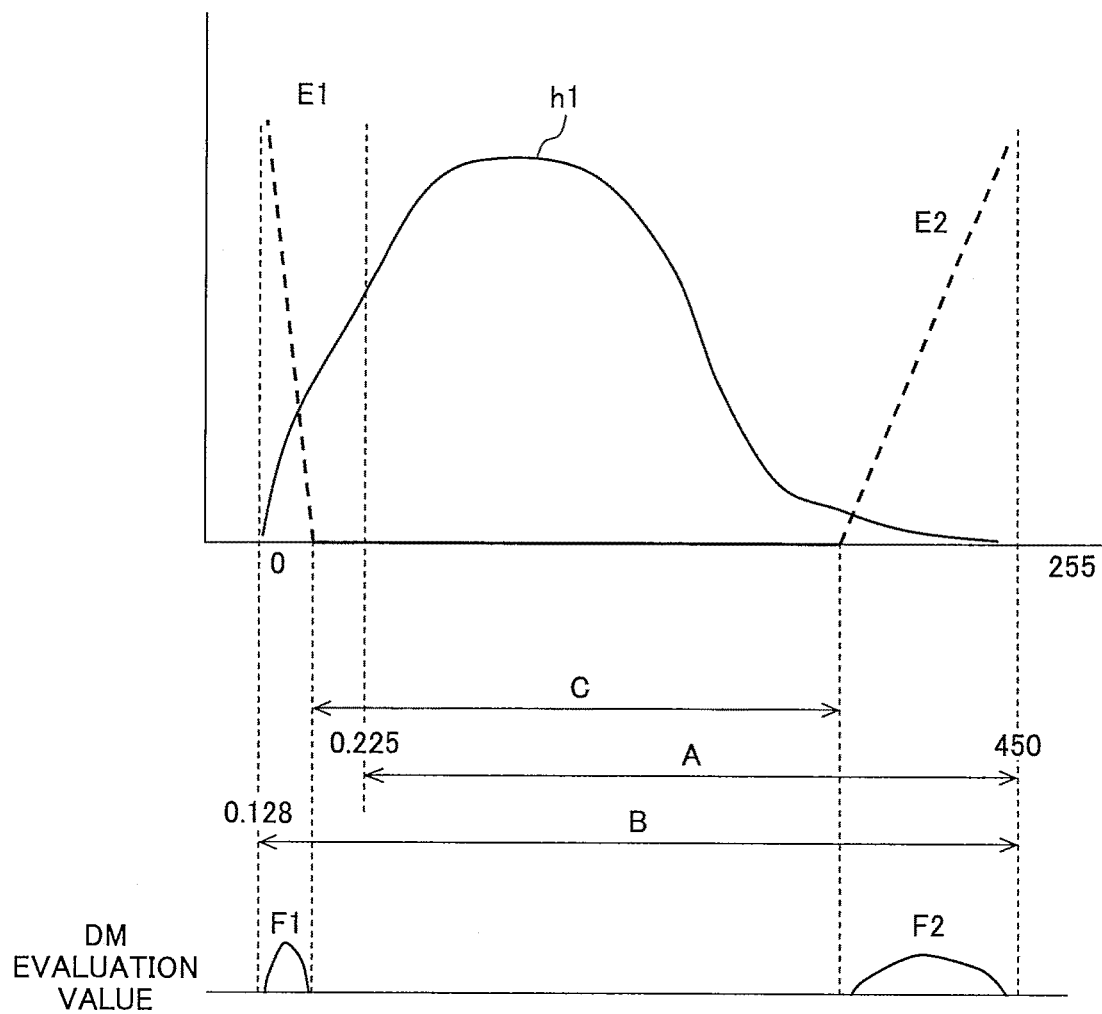
FIG. 9 is a diagram showing a video image luminance range at a 70% light emission luminance level that is one of the objects to be selected in a video image display apparatus.
Figure 10:
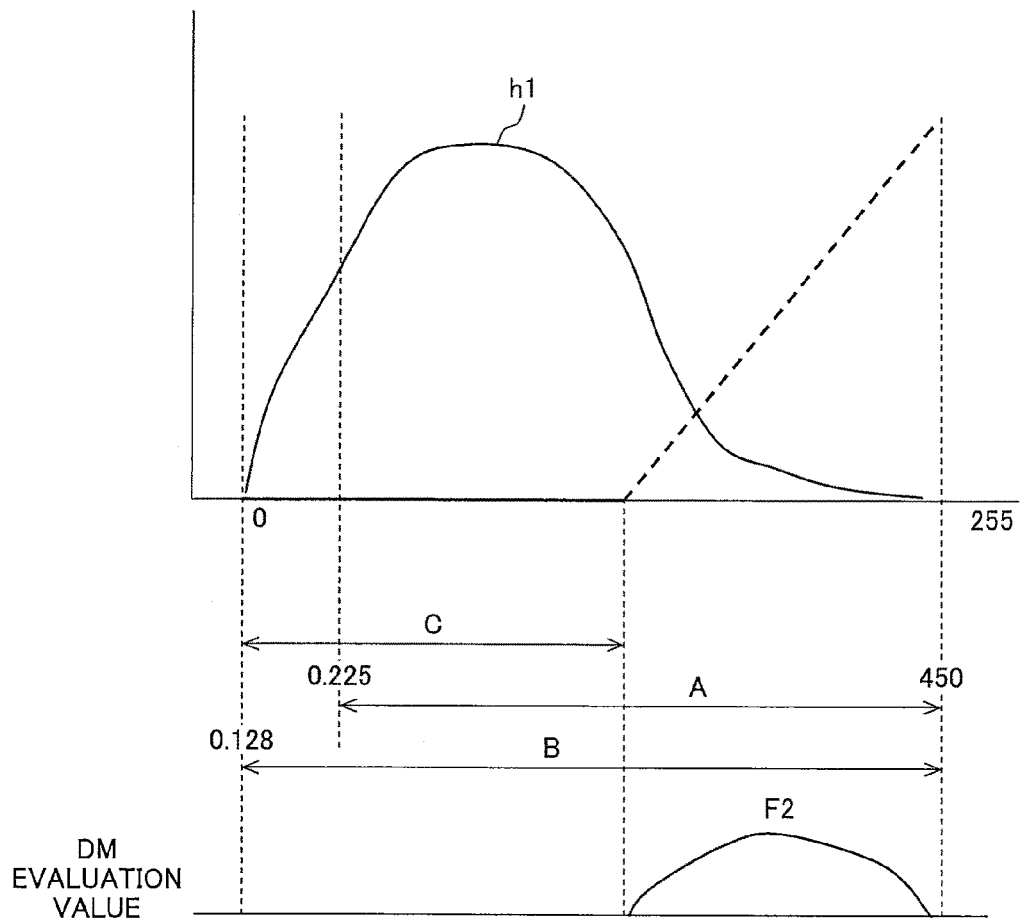
FIG. 10 is a diagram showing a video image luminance range at a 50% light emission luminance level that is one of the objects to be selected in a video image display apparatus.

FIG. 8 is a diagram showing a video image luminance range C when light emission luminance level that is one of selection objects is 100%, FIG. 9 is a diagram showing a video image luminance range C when light emission luminance level that is one of the selection objects is about 70%, FIG. 10 is a diagram showing a video image luminance range C when light emission luminance level that is one of the selection objects is about 50%. Each of alphabetical signs in FIGS. 8 to 10 accords to those in FIG. 6.

As shown in FIG. 8, when the light emission luminance level is 100%, there is a value of a certain level in the evaluation value F1 of the low luminance part, and there is no value in the evaluation value F2 of the high luminance part. Furthermore, as shown in FIG. 9, when the light emission luminance level is lowered to about 70%, both of the evaluation value F1 of the low luminance part and the evaluation value F2 of the high luminance part have a low value. Additionally, as shown in FIG. 10, when the light emission luminance level is lowered to about 50%, there is no value in the evaluation value F1 while the evaluation value F2 of the high luminance part has a great value. When areas (accumulated total) of the evaluation value calculation results at each light emission luminance level illustrated in FIGS. 8 to 10 are compared with each other, the lowest occurs when the light emission luminance level is 70%. Accordingly, in the distortion module 5, the light emission luminance level of about 70% is selected and output.

<<Configuration Design Portion 13>>

A basic model showing a relation between a pixel value to be input to a liquid crystal panel and display luminance in a liquid crystal panel is shown by the following formula (3). Here, Y is display luminance in a liquid crystal panel, BL is a light emission luminance level of backlight (backlight DUTY), and CV (Code Value) is a pixel value to be input to the liquid crystal panel. Additionally, in this example, it is assumed that the gradation of a video image signal is quantized into 0 to 255.

$$Y = BL(CV/255)^\gamma \quad (3)$$

When the light emission luminance of the backlight is lowered due to the light emission luminance level $BL_{reduced}$ selected by the distortion module 5, the configuration design portion 13 adjusts a video image gain so that luminance on a screen is raised. If the pixel value to which gain is applied is supposed to be $CV_{reduced}$, brightness (display luminance in the liquid crystal panel) of a screen is $BL_{reduced} (CV_{reduced}/255)^\gamma$ when the light emission luminance level is lowered. On the other hand, brightness of a screen is $BL_{ref}(CV_{ref}/255)^\gamma$ when backlight is controlled by a light emission luminance level for reference $BL_{ref}$. A pixel value may be determined so that these values are equalized and an amount of drop in light emission luminance of backlight caused by the light emission luminance level $BL_{reduced}$ is compensated. That is, the configuration design portion 13 may perform the gain setting that meets the following formula (4).

$$Y=BL_{reduced}(CV_{reduced}/255)^\gamma=BL_{ref}(CV_{ref}/255)^\gamma \quad (4)$$

Accordingly, gain (referred to as G) is represented by the following formula (5). For example, when the light emission luminance level for reference $BL_{ref}$ is 100%, G is represented by the following formula (6). Note that, a relation between $BL_{ref}$ and $BL_{reduced}$ is stored as a look up table in a ROM, etc. of the configuration design portion 13, and calculation processing of the following formula (5) is preferably executed at a high speed.

$$G=CV_{reduced}/CV_{ref}=(BL_{ref}/BL_{reduced})^{1/\gamma} \quad (5)$$

$$G=(1/B_{reduced})^{1/\gamma} \quad (6)$$

<<RGBγ/WB Adjustment Portion 15>>

Figure 12:
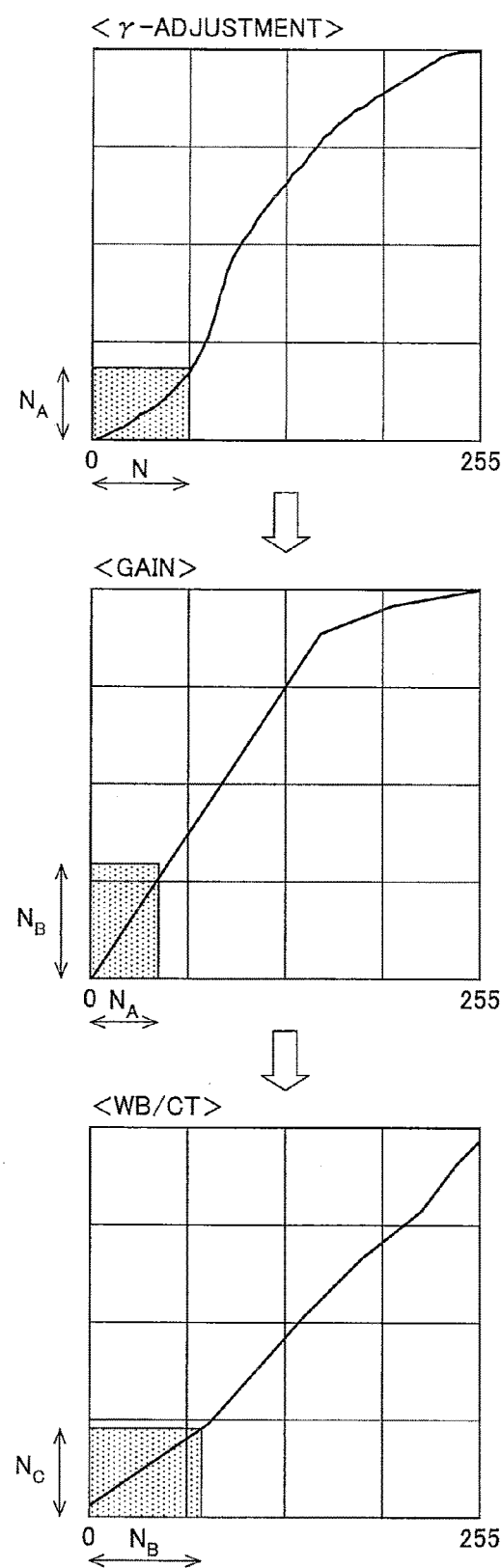
FIG. 12 is a diagram for explaining adjustment processing in an $RGB_\gamma$/WB adjustment portion.

FIG. 11 is a diagram showing an example of a video image signal gain that is set by the RGBγ/WB adjustment portion based on a gain setting signal output from the advanced luminance modulation portion in the video image display apparatus of FIG. 2, and FIG. 12 is a diagram for explaining an adjustment processing example in the RGBγ/WB adjustment portion in the video image display apparatus of FIG. 2.

With reference to FIG. 11, description will be given for a relation between a gain setting value (conversion coefficient) to be input and a gain curve obtained therefrom. As shown in FIG. 11 (A), when a gain setting of a video image signal output from an advanced luminance modulation portion 20 is 1.0, there is no problem as being a gain as it is, in which, for all the luminance, values thereof are simply multiplied, that is, being linear as it is. However, when the gain is 1.0 or more, as shown in FIG. 11 (B), a high luminance part is a value of 255 uniformly, and so-called clipped whites occur. A basic concept of the advanced luminance modulation processing is to sacrifice the clipped whites in a small number of white luminance parts to improve deepness of a black level, and processing may be executed by the RGBγ/WB adjustment portion 15 with the gain such as in FIG. 11 (B), however, it is better to avoid, for a quality level, that the high luminance part is apparently constant (reach the top) at the value of 255.

Consequently, reduction in gradation feature of a high luminance part is preferably alleviated by performing a signal expansion for low and intermediate luminance in accordance with a gain setting, and, by making a gain curve non-linear for a high luminance. This technique is the relation of the trade-off between the brightness and the clipped whites. When a region formed to be non-linear is narrowed, a region whose normal brightness can be expressed is increased, however, the gradation feature of high luminance may be lowered. On the contrary, when a region formed to be non-linear is widened, a region whose normal brightness can be expressed is reduced, however, the gradation feature of high luminance may be maintained to some extent. In an actual product, the luminance formed to be non-linear is, for example, a part of 90% or more, or a part of 95% or more of an output by the gain setting and only a part where an effect of the clipped whites will be given may be formed to be non-linear. In FIG. 11 (C), a gain curve is shown in which a part of 90% or more is corrected to be non-linear when the gain setting is 1.2. Furthermore, in FIG. 11 (D), a gain curve is shown in which a part of 90% or more is corrected to be non-linear when the gain setting is 1.6.

Furthermore, as described above, when the gain setting exceeds 1.0, to avoid to reach the top, the gain curve needs to be formed to be non-linear partly. However, RGBγ/WB adjustment portion 15 is not able to calculate such a gain curve simply by proportional calculation based on the gain setting. Therefore, providing a gain curve for each gain setting is considered, however, it is difficult since there is a concern of a memory capacity. Then, the linear part is simply subjected to proportional calculation from the gain setting value, and for the part of 90% or more as illustrated in FIGS. 11 (C) and (D), a non-linear part may be calculated by interpolation or the like. Note that, the gain setting is changed for each frame, and a gain curve is calculated for each time.

Next, with reference to FIG. 12, description will be given for each adjustment processing in the RGBγ/WB adjustment portion 15. The RGBγ/WB adjustment portion performs processing to obtain a gain by above-described gain curve, γ-adjustment processing of a video image, WB adjustment processing, and also an adjustment of a CT (color temperature) and the like for a video image signal output from the image quality correction portion 14. Additionally, CT adjustment processing may be executed with reference to one adjustment curve together with the WB adjustment processing.

Furthermore, each processing executed by the RGBγ/WB adjustment portion 15 is executed independently of each of R, G, and B of a video image signal. At that time, for the γ-adjustment processing and the processing to obtain a gain, calculation is performed by a curve which is the same in R, G, and B, and for the WB adjustment processing/CT adjustment processing, calculation is performed using a separate curve for properties of R, G, and B. Then, as an order of each processing to be executed by the RGBγ/WB adjustment portion 15, firstly the γ-adjustment processing is applied, next, processing to obtain a gain is applied, and finally, WB adjustment processing/CT adjustment processing is preferably executed. In fact, as shown in FIG. 12, the region N of a low gradation is not so amplified in NA→, NB→NC, and noise in the low gradation part becomes inconspicuous. Contrary to this, when processed in the order of gain→γ-adjustment→WB/CT, noise in a first region of the low gradation is amplified. This is understood by that the processing to obtain a gain is a conversion to compensate control to lower the light emission luminance level of backlight, and the processing is preferably performed near a liquid crystal panel.

<Specific Example of Advanced Luminance Modulation Processing>

In the advanced luminance modulation processing, an optimum light emission luminance level $BL_{reduced}$ of backlight is selected in accordance with a luminance histogram of an input video image signal, and a video image gain is given in accordance with the selected light emission luminance level $BL_{reduced}$ to nearly maintain the brightness on a screen, and lower power consumption by reducing the light emission luminance level of backlight is realized.

Furthermore, a video image display apparatus with a method for adjusting the light emission luminance of the backlight dynamically in accordance with an input video image signal changed per screen unit to make a display image more visible, or to reduce the power consumption, has been conventionally provided. In this method, as a video image characteristic amount of the input video image signal, for example, an APL or a histogram is detected, and in accordance with the detected video image characteristic amount, the light emission luminance level of the backlight is changed. For each screen, a screen luminance is thereby changed in accordance with the video image characteristic amount of the screen. Therefore, for example, control to suppress the backlight luminance is executed so that glaring is not felt by the high luminance, a video image display of an optimum video image quality is performed, and lowering power consumption is realized.

In the present invention, such a control method of light emission luminance of backlight in accordance with the video image characteristic amount is used, the light emission luminance level in accordance with the video image characteristic amount is used for calculation of a video image gain as a reference value ($BL_{ref}$) (refer to the above formula (5)), and the reference value $BL_{ref}$ is used for determination of a light emission luminance level $BL_{reduced}$ (determination in accordance with a histogram and a target CR) for actually applying to backlight control.

In the embodiment according to the present invention, the advanced luminance modulation technology as described above is used to enable an expression of the brightness feeling avoiding the clipped whites on one hand, and enable a video image expression in which the black level is improved. Hereinafter, description will be given for comparison examples and embodiment examples according to the present invention using the advanced luminance modulation.

COMPARISON EXAMPLE

FIG. 13 is a diagram for explaining an operation example of the advanced luminance modulation when the light emission luminance level for reference $BL_{ref}$ is set to be 100%.

The setting value set in the distortion module 5 is as follows.
  a) a panel CR (contrast ratio of a panel that is used); 2000
  b) a target CR (contrast ratio of a panel that is a target); 3500
  c) a luminance control range of backlight; 20% to 100%

Furthermore, a histogram of input video image signals is distributed to all the luminance values 0 to 255 as shown in FIG. 13 (B). Further, the APL of the input video image signal is 50%. The graph F of FIG. 13 (A) shows the same histogram.

The light emission luminance level for reference $BL_{ref}$ of the backlight light source for the APL is, as shown in FIG. 13 (C), set to be 100% that is constant irrespective of the value of the APL of the input video image signal. Note that, the luminance control properties are shown in a graph G of FIG. 13 (A).

Since the light emission luminance level for reference (target light emission luminance value) $BL_{Ref}$ set by the BL luminance level setting portion 8 is 100% irrespective of the APL of the input video image signal all the time, even when the APL is 50% (arrow g), for example, the light emission luminance level $BL_{Ref}$ of 100% is set.

Since the light emission luminance level for reference $BL_{Ref}$ is 100%, the distortion module 5 selects a light emission luminance level of backlight so that an apparent luminance in panel displaying becomes 100%. Here, an evaluation value is judged from the histogram of the input video image signal, and the lowest light emission luminance level is selected among the obtainable light emission luminance levels.

In this example, the histogram of the video image is distributed to all from 0 to 255, and the frequency of the 255 that is the maximum luminance is not a little, the evaluation value of the light emission luminance level of 100% becomes the lowest. Therefore, in the distortion module 5, 100% is selected as the light emission luminance level $BL_{reduced}$.

The advanced luminance modulation portion 20 outputs backlight duty of 100% based on the setting of the distortion module 5. Additionally, in the configuration design portion 13, a gain of a video image signal is set from the light emission luminance level for reference $BL_{Ref}$ and the light emission luminance level $BL_{reduced}$ selected by the distortion module 5. In this case, both of the light emission luminance levels $BL_{Ref}$ and T. $BL_{reduced}$ are 100%, and the gain setting by the formula (5) is 1.00 and there is no change in the gain. Therefore, in the panel, a level of an input signal is displayed as it is irrespective of an APL value.

Example 1

FIG. 14 is a diagram for explaining an example of the advanced luminance modulation processing applicable to the video image display apparatus of the present invention. In this example, a video image of an intermediate luminance is expressed in brighter and higher contrast, and it makes possible to express a high luminance video image in a clear display avoiding clipped whites and also to express for a low luminance video image with an improved black level.

In this example, an APL is used as a video image characteristic amount to determine the luminance control properties, and the light emission luminance level for reference is set to be a value greater than 100% that is originally not able to be output to perform an expression of a video image of an intermediate luminance to be brighter and higher in contrast, when the APL of the video image signal is in the middle level.

Various settings in this example are as follows.
  a) a panel CR (contrast ratio of a panel that is used); 2000
  b) a target CR (contrast ratio of a panel that is a target); 3500
  c) a luminance control range of backlight; 20% to 100%

Then, in this example, the luminance control properties for prescribing the light emission luminance of a backlight light source for an APL is set to be the properties as shown in FIG. 14 (B) (same as a graph G of FIG. 14 (A)). That is, when the APL is in a range of the intermediate luminance of the first value L1 or more, or of the second value L2 or less, the light emission luminance level for reference $BL_{Ref}$ is set to be 105% (as shown in FIG. 14 (B), some inclination may be included in the border of 100% and 105%).

Although, originally, the light emission luminance level for reference $BL_{Ref}$ should have a value in a range of being actually usable, 105% which is the value outside the range of using is set intentionally in the embodiment according to the present invention. Furthermore, when the APL is lower than the first value L1 or when higher than the second value L2, the light emission luminance level for reference $BL_{Ref}$ is the value of 100%.

By making the light emission luminance level for reference $BL_{Ref}$ 105%, the degree of amplification of a video image by a gain can be set to be a value greater than a value by which an input video image signal of the maximum luminance can be displayed appropriately when the light emission luminance of the light source is at maximum.

In this example, the APL of the input video image signal is 50%, and corresponds to a part of the arrow g in FIG. 14 (B), and 105% is selected as the light emission luminance level for reference $BL_{Ref}$. Here, in the distortion module 5, although the light emission luminance level for reference $BL_{Ref}$ is 105%, since the luminance control range of the backlight is 20% to 100%, a light emission luminance level Rt reduced used for control is selected therefrom. Here, similarly to a case of FIG. 13 of the above comparative example, since the histogram is distributed to all from 0 to 255, 100% which evaluation value is the lowest as the light emission luminance level $BL_{reduced}$ is selected. The advanced luminance modulation portion 20 outputs backlight duty of a light emission luminance level of 100% based on the setting of the distortion module 5.

Furthermore, the configuration design portion 13 sets a gain of a video image signal from the light emission luminance level ($BL_{reduced}$) of 100% selected by the distortion module 5 and the light emission luminance level for reference ($BL_{Ref}$) of 105%. In this case, gain=$(105/100)^{1/\gamma}$=1.02 ($\gamma$=2.2). An apparent light emission luminance level on a panel display is thereby able to obtain the effect of 105% not 100% and make a video image clearer.

As described above, since a region in which the light emission luminance level for reference $BL_{Ref}$ is set to be 105% is only the predetermined range where the APL is a middle level, when the APL is high for an entire video image, to be clear without clipped whites, and when the APL is in the intermediate level, an expression which is brighter and higher in contrast is possible than an expression in the case of the light emission luminance level of backlight is 100%.

That is, a video image of brighter and higher in contrast can be displayed by setting light emission luminance level for reference $BL_{Ref}$ to exceed 100% when the APL is in the predetermined range of a middle level.

In the present invention, the input video image signal is amplified all the time when the video image characteristic amount meets the predetermined conditions, and a case of amplifying and a case of not amplifying the input video image signal are included when the video image characteristic amount does not meet the predetermined conditions. In this example, the above video image characteristic amount is the APL and the above predetermined conditions are that the APL is the first value L1 or more and the second value L2 or less. In this case, since the light emission luminance level for reference $BL_{Ref}$ becomes the value exceeding 100%, the gain becomes a value exceeding 1 all the time and the input video image signal is amplified all the time even when any light emission luminance level ($BL_{reduced}$) is selected by the distortion module 5. Additionally, since the light emission luminance level for reference $BL_{Ref}$ becomes the value of 100% when the APL is smaller than the first value L1, or larger than the second value L2, a gain becomes larger than 1 or a gain becomes 1 in accordance with the light emission luminance level ($BL_{reduced}$) selected by the distortion module 5, and thereby a case of amplifying and a case of not amplifying an input video image signal are generated.

An operation example of advanced luminance modulation according to an example 1 for various input video image signals will hereinafter be shown.

Operation Example 1-1

In this operation example, an input video image signal is assumed to be a video image whose histogram of video image signals is distributed in high luminance values around 255 in the histogram, and an APL thereof is 90% (video image of a snow scene, for example) as shown in FIG. 15 (A).

In this case, since a lot of high luminance components are contained in the histogram of the video image signal, a distortion module 5 selects 100% as a light emission luminance level of a backlight light source $BL_{reduced}$.

In addition, when the APL is 90%, predetermined conditions of the luminance control properties shown in FIG. 14 (B), namely, the conditions that the APL is a first value L1 or more and is a second value L2 or less are not met, therefore, 100% is set as a light emission luminance level for reference $BL_{Ref}$. Accordingly, again set by a configuration design portion 13 is $(100/100)^{1/2.2}$=1, and amplification of the video image is not performed. It is thereby possible to prevent clipped whites of the video image signal with much high luminance. The condition is for an example in which amplification of the video image signal is not performed when a video image characteristic amount (APL) of the video image signal does not meet the predetermined conditions. In this case, when the predetermined conditions are not met and light source luminance is the maximum luminance, amplification is not performed.

Operation Example 1-2

In this operation example, an input video image signal is assumed to be a video image whose histogram of video image signals is distributed in high luminance values around 255 and also distributed around low luminance values at not a little rate, and an APL thereof is 85% (video image of a person wearing black clothing in a snow scene, for example) as shown in FIG. 15 (B).

In this case, a high luminance component is much contained in the histogram of the video image signal, therefore, the distortion module 5 selects 100% as a light emission luminance level of a backlight light source $BL_{reduced}$. This is because pixels that may not be expressed in a high luminance part increase when a light emission luminance of a backlight light is smaller than 100%, and a value of evaluation value (Distortion) is caused to be great.

In addition, when the APL is 85%, the predetermined conditions of the luminance control properties shown in FIG. 14 (B), that is, that the APL is the first value L1 or more and is the second value L2 or less, are not met, therefore, 100% is set as a light emission luminance level for reference $BL_{Ref}$. Accordingly, a gain set by the configuration design portion 13 is $(100/100)^{1/2.2}$=1, and amplification of the video image is not performed. It is thereby possible to prevent the clipped whites of a video image signal with much high luminance. The conditions also show an example in which amplification of the video image signal is not performed when the video image characteristic amount (APL) of the video image signal does not meet the predetermined conditions. In this case, when the predetermined conditions are not met and the light source luminance is the maximum luminance, amplification is not performed.

Operation Example 1-3

In this operation example, an input video image signal is assumed to be a video image whose histogram of video image signals is distributed in high luminance values around 230 that is slightly lower than those in the above operation examples 1 and 2 and also distributed around low luminance values at not a little rate, and an APL thereof is 81% (video image of a bright forest, for example) as shown in FIG. 15 (C).

In this case, in the histogram of the video image signal, a frequency around black is 0 and an evaluation value at that time is 0. Accordingly, such a light emission luminance level of a backlight light source that causes a distortion evaluation value around white to be is selected, and for example, 80% is selected as $BL_{reduced}$.

In addition, when the APL is 81%, the predetermined conditions of the luminance control properties shown in FIG. 14 (B), that is, that the APL is the first value L1 or more and is the second value L2 or less, are not met, therefore, 100% is set as a light emission luminance level for reference $BL_{Ref}$. Accordingly, a gain set by the configuration design portion 13 is $(100/100)^{1/2.2}=1.11$, and amplification of a video image is performed. In this case, backlight source luminance is slightly lowered, so the video image signal is amplified, however, since the maximum luminance of the video image signal after the amplification is 255 or less, the clipped whites do not occur. The conditions show an example in which, when the video image characteristic amount (APL) of the video image signal does not meet the predetermined conditions and light source luminance is lowered from the maximum luminance, amplification is performed.

Operation Example 1-4

In this operation example, an input video image signal is assumed to be a video image whose histogram of video image signals is distributed on high luminance side and low luminance side at the same rate with intermediate luminance as a center, and an APL thereof is 48% (video image of a studio for news show, for example) as shown in FIG. 16 (A).

In this case, since a video image with extremely high luminance does not exist in the histogram of the video image signal, in the distortion module 5, 60% is selected as a light emission luminance level of a backlight light source $BL_{reduced}$ from an evaluation value of the histogram.

In addition, when the APL is 48%, the predetermined conditions of the luminance control properties shown in FIG. 14 (B), that is, that the APL is the first value L1 or more and is the second value L2 or less, are met and a light emission luminance level for reference $BL_{Ref}$ is set to be 105%. Accordingly, a gain set by the 2=configuration design portion 13 is $(105/60)^{1/2.2}=1.29$, and amplification of a video image is performed. In this case, since a light emission luminance level for reference $BL_{Ref}$ is set at a value greater than 100% in addition to a compensation amount for the amount that backlight light source luminance is slightly lowered, the video image signal is amplified a little bit greatly, thus a video image display with a high contrast and a brightness feeling can be performed. The conditions show an example in which amplification of the video image signal is performed when the video image characteristic amount (APL) of the video image signal meets the predetermined conditions.

Operation Example 1-5

In this operation example, an input video image signal is assumed to be a video image whose histogram of video image signals is distributed in low luminance, and in bright luminance at a little rate, and an APL thereof is 22% (video image of stars in night sky, for example) as shown in FIG. 16 (B).

In this case, extremely high luminance exists at not a little rate in the histogram of the video image signal, however, in the distortion module 5, since a value of an evaluation value (Distortion) becomes greater when 100% is selected as a light emission luminance level of a backlight light source $BL_{reduced}$, 70% where an expression of black color is possible and can be maintained as high as possible, is selected as a light emission luminance level $BL_{reduced}$.

In addition, when the APL is 22%, the predetermined conditions of the luminance control properties shown in FIG. 14 (B), that is, that the APL is the first value L1 or more and is the second value L2 or less are not met, therefore, a light emission luminance level for reference $BL_{Ref}$ is set to be 100%. Accordingly, a gain set by the configuration design portion 13 is $(100/70)^{1/2.2}=1.18$, and amplification of a video image is performed. In this case, it is possible to display an image in which the expression of black color is emphasized and slight clipped whites are allowed. The conditions show an example in which amplification of the video image signal is performed, when the video image characteristic amount (APL) of the video image signal does not meet the predetermined conditions. In this case, amplification is performed when the predetermined conditions are not met and light source luminance becomes lower than the maximum luminance.

Note that, depending on brightness of background and an amount of stars, light emission luminance of backlight that is selected is changed, and the case where a video image signal is not amplified is possible.

Operation Example 1-6

In this operation example, as a video image signal to be input, a video image whose histogram of video image signals is distributed totally in low luminance, and an APL thereof is 25% (video image of movie, for example) is used as shown in FIG. 16 (C). In this case, high luminance hardly exists in the histogram of the video image signal, therefore, in the distortion module 5, 50% that is a low level is selected as a light emission luminance level of a backlight light source $BL_{reduced}$ from an evaluation value of the histogram.

In addition, when the APL is 25%, the predetermined conditions of the luminance control properties shown in FIG. 14 (B), that is, that the APL is the first value L1 or more and is the second value L2 or less are not met, therefore, a light emission luminance level for reference $BL_{Ref}$ is set to be 100%. Accordingly, a gain set by the configuration design portion 13 is $(100/50)^{1/2.2}=1.37$, and amplification of the video image is performed. In this case, it is possible to appeal the expression of deepness of a black level on the low luminance side by ignoring a video image on the high luminance side that exists a little. The conditions show an example in which, amplification of the video image signal is performed when the video image characteristic amount (APL) of the video image signal does not meet the predetermined conditions. Also in this case, amplification is performed when the predetermined conditions are not met and light source luminance is lowered from the maximum luminance.

Hereinbefore, according to the example 1, an operation is carried out such that amplification of a video image signal is performed all the time by setting that further amplification is possible when the APL as a video image characteristic amount is in a range of intermediate luminance that is the first value L1 or more and is the second value L2 or less.

On the other hand, when the APL is greater than the second value L2 a video image is amplified in the case of compensating slight lowering of light source luminance, however, amplification of the video image is not performed for an image that should be displayed with a light source at the maximum light emission luminance.

In addition, since the image is totally dark in many cases, when the APL is smaller than the first value L1, the video image signal is amplified so that light emission luminance of a light source is basically compensated, however, since there is also a case in which a display should be performed with a light source at the maximum luminance when a high luminance part exists at not a little rate like images of stars and fireworks in night sky, an operation is carried out that the video image is not amplified in such a case.

Example 2

In this example, a brighter and high contrast expression is also performed for a video image of low luminance in addition to a video image of intermediate luminance, and in a high luminance video image, a clear display is possible while the clipped whites are being avoided.

In this example, to perform the brighter and high contrast expression of intermediate luminance and low luminance, when the APL as a video image characteristic amount is an intermediate level or less, a light emission luminance level for reference $BL_{Ref}$ is set at a value greater than 100% that can not be output originally.

Various settings in this example are similar to the example 1 as follows:
  a) a panel CR (contrast ratio of a panel that is used); 2000
  b) a target CR (contrast ratio of a panel that is a target); 3500
  c) a luminance control range of backlight; 20% to 100%

Figure 17:
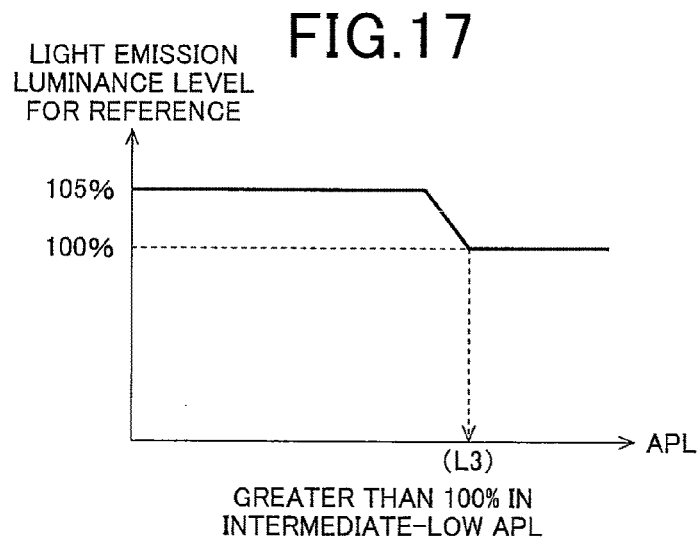
FIG. 17 is a diagram showing an example of luminance conversion properties that are used for advanced luminance modulation processing.

Then, in this example, luminance control properties that prescribe light emission luminance of a backlight light source for the APL is set to be properties as shown in FIG. 17. That is, when the APL is in a range of low and intermediate luminance that is a predetermined value L3 or less, a light emission luminance level for reference $BL_{Ref}$ is set to be 105%. In addition, when the APL is higher than the predetermined value L3, a light emission luminance level for reference $BL_{Ref}$ is a value of 100%. That is, the luminance control properties like in FIG. 17 mean that an operation is changed only when the APL is in a predetermined range that is an intermediate level or less.

In this example, an operation when the APL of an input video image signal is greater than the predetermined value L3, that is, in the case of the video image signal of the operation example 1-1 to the operation example 1-3 in the example 1, similar operation is also performed in this example. In addition, in the case of an operation, when the APL is the first value L1 or more and is the second value L2 or less in the example 1, that is the video image signal of the operation example 1-4 in the example 1, similar operation is also performed in this example.

Operation Example 2-5

Description will be given for an operation example of this example by the video image signal of the operation example 1-5 of the example 1. In this operation example, an input video image signal is assumed to be a video image whose histogram of video image signals is distributed in low luminance, and in bright luminance at a little rate, and an APL thereof is 22% as shown in FIG. 16 (B).

In this case, extremely high luminance exists at not a little rate in the histogram of the video image signal, however, in the distortion module 5, a value of an evaluation value (Distortion) becomes great when 100% is selected as a light emission luminance level of a backlight light source $BL_{reduced}$, therefore, 70% where the expression of black color is possible and can be maintained as high as possible, is selected as a light emission luminance level $BL_{reduced}$.

In addition, when the APL is 22%, the predetermined conditions of the luminance control properties shown in FIG. 17, that is, that the APL is the predetermined value L3 or less are met, therefore, a light emission luminance level for reference $BL_{Ref}$ is set to be 105%. Accordingly, a gain set by the configuration design portion 13 is $(105/70)^{1/2.2}=1.20$, and amplification of a video image is performed. In this case, it is possible to perform amplification of a low luminance part more than an extent of compensation of luminance, and give priority to the brightness feeling. However, the clipped whites on high luminance side become slightly large. The conditions show an example in which, amplification of a video image signal is performed, when a video image characteristic amount (APL) of a video image signal meets the predetermined conditions.

Description will be given for an operation example of this example by the video image signal of the operation example 1-6 of the example 1. In this operation example, a video image signal to be input is a video image whose histogram of video image signals is distributed totally in low luminance, and an APL thereof is 25% as shown in FIG. 16 (C). In this case, since high luminance hardly exists in the histogram of the video image signal, in the distortion module 5, 50% that is a low level is selected as a light emission luminance level of a backlight light source $BL_{reduced}$ from an evaluation value of the histogram.

In addition, when the APL is 25%, the predetermined conditions of the luminance control properties shown in FIG. 17, that is, that the APL is the predetermined value L3 or less, are met, therefore, a light emission luminance level for reference $BL_{Ref}$ is set to be 105%. Accordingly, a gain set by the configuration design portion 13 is $(105/50)^{1/2.2}=1.40$, and amplification of a video image is performed. In this case, an expression emphasizing a brightness contrast feeling more than the expression of black is enabled. The conditions show an example in which, when a video image characteristic amount (APL) of a video image signal satisfies predetermined conditions, amplification of a video image signal is performed.

In this operation example, since video image signals hardly exist in a high luminance part, the clipped whites are not conspicuous.

Example 3

This example is that, in a configuration of the present invention which an input video image signal is amplified all the time when a video image characteristic amount satisfies the predetermined conditions, and has a case where the input image signal is amplified and a case of not amplified when the video image characteristic amount does not meet the predetermined conditions, as the above video image characteristic amount, average luminance of the input video image signal and a frequency that could not be expressed, if expanded, out of input video image signals are used, and the predetermined conditions are that the frequency of the input video image signal is a predetermined rate or less.

In this example, it is determined whether the light emission luminance level for reference $BL_{Ref}$ is set to be 100% or a value greater than 100% by estimating a frequency of the clipped whites that occurs by setting a light emission luminance level for reference $BL_{Ref}$ to be a value greater than 100% that can not be output originally. That is, occurrence of the clipped whites is suppressed to the minimum by estimating the frequency of the clipped whites.

Various settings in this example are similar to the example 1 as follows:
  a) a panel CR (contrast ratio of a panel that is used); 2000
  b) a target CR (contrast ratio of a panel that is a target); 3500
  c) a luminance control range of backlight; 20% to 100%

Figure 18:
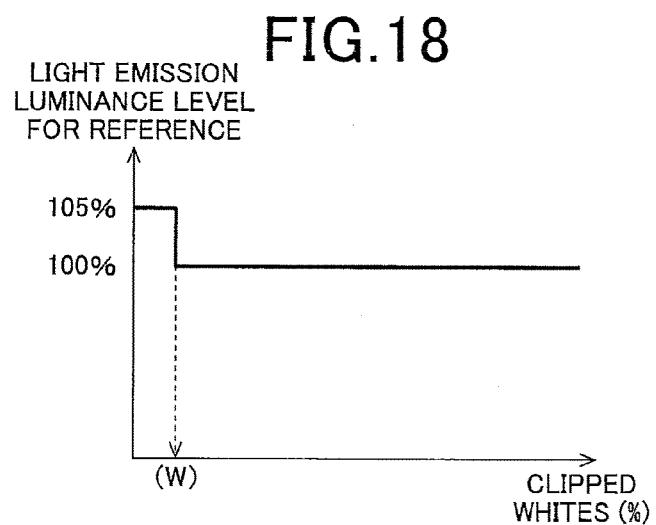
FIG. 18 is a diagram showing a relation between clipped whites that are used for advanced luminance modulation processing and a light emission luminance level for reference.

In this example, as shown in FIG. 18, when estimated a frequency of the clipped whites is less than W % (less than 5%, for example), a light emission luminance level for reference $BL_{Ref}$ is set to be 105% and when being W % or more, setting is made to be 100% or less. Description will hereinafter be given for what operation is performed in the example using the same example as the input video image signal used in the example 1.

Operation Example 3-1

In this operation example, an input video image signal is a video image whose histogram of video image signals is distributed in high luminance values around 255, and an APL thereof is 90% as shown in FIG. 15 (A). As described in the operation example 1-1 of the above example 1, since a high luminance component is much contained in the video image signal, the distortion module 5 selects 100% as a light emission luminance level of a backlight light source $BL_{reduced}$.

Here, when a light emission luminance level for reference $BL_{Ref}$ is set to be 105%, a gain at the time is $(105/100)^{1/2.2}=1.02$, and limit luminance that causes the clipped whites are $255/1.02=250$.

Then, since the input video image signal of this example includes luminance of 250 or more, W % (5% here) or more, 100% is set as a light emission luminance level for reference $BL_{Ref}$. Accordingly, a gain set by the configuration design portion 13 is $(100/100)^{1/2.2}=1$, and amplification of the video image signal is not performed. It is thereby possible to prevent the clipped whites of a video image signal with much high luminance. The conditions show an example in which, when a video image signal does not meet the predetermined conditions, amplification of a video image signal is not performed. In this case, amplification is not performed when the predetermined conditions are not met and light source luminance is the maximum luminance.

Operation Example 3-2

In this operation example, an input video image signal is a video image whose histogram of video image signals is distributed in high luminance values around 255 and also distributed around low luminance values at not a little rate, and an APL thereof is 85% as shown in FIG. 15 (B). As described in the operation example 1-2 of the above example 1, since a high luminance part is much contained in the video image signal, the distortion module 5 selects 100% as a light emission luminance level of a backlight light source $BL_{reduced}$. Accordingly, an operation result becomes similar to the above (operation example 1-2 of the example 1), and 100% is set as a light emission luminance level for reference $BL_{Ref}$, and a gain is $(100/100)^{1/2.2}=1$, and amplification of the video image signal is not performed. It is thereby possible to prevent the clipped whites of the video image signal with much high luminance. The conditions are an example in which, amplification of a video image signal is not performed when a video image signal does not meet the predetermined conditions. Also in this case, amplification is not performed when the predetermined conditions are not met and light source luminance is the maximum luminance.

Operation Example 3-3

In this operation example, an input video image signal is a video image whose histogram of video image signals is distributed in luminance values around 230 and also distributed around low luminance values at not a little rate, and an APL thereof is 85% as shown in FIG. 15 (C). As described in the operation example 1-3 of the above example 1, there is a relatively much high luminance component in the input video image signal, however, an extremely high video image does not exist, therefore, distortion module 5 selects 80% as a light emission luminance level of a backlight light source $BL_{reduced}$.

Here, when a light emission luminance level for reference $BL_{Ref}$ is set to be 105%, a gain at this time is $(105/80)^{1/2.2}=1.13$, and limit luminance that causes the clipped whites is $255/1.13=225$.

Then, since the input video image signal of this example includes luminance of 225 or more, W % (5% here) or more, 100% is set as a light emission luminance level for reference $BL_{Ref}$. Accordingly, a gain set by the 2=configuration design portion 13 is $(100/80)^{1/2.2}=1.11$, and amplification of the video image is performed. The amplification of the video image signal is thereby performed, however, the clipped whites do not occur. The conditions show an example in which, amplification of a video image signal is performed when a video image signal does not meet the predetermined conditions. In this case, amplification is performed when the predetermined conditions are not met and light source luminance is lowered from the maximum luminance.

Operation Example 3-4

In this operation example, an input video image signal is a video image whose histogram of video image signals is distributed on high luminance side and low luminance side at the same rate with intermediate luminance as a center, and an APL thereof is 48% as shown in FIG. 16 (A). As described in the operation example 1-4 of the above example, since a video image with extremely high luminance does not exist in the histogram of the video image signal of this example, 60% is selected as a light emission luminance level of a backlight light source $BL_{reduced}$ from an evaluation value of the histogram in the distortion module 5.

Here, when a light emission luminance level for reference $BL_{Ref}$ is set to be 105%, a gain at this time is $(105/60)^{1/2.2}=1.29$, and limit luminance that causes the clipped whites is $255/1.29=198$.

Then, in the input video image signal of this example, luminance of 198 or more hardly exists and is less than W % (5% here), therefore 105% is set as a light emission luminance level for reference $BL_{Ref}$. Accordingly, a gain set by the configuration design portion 13 is $(105/60)^{1/2.2}=1.29$, and amplification of a video image is performed. It is thereby possible to appeal the brightness feeling more than usual, and since pixels hardly exist in clipped whites region, the clipped whites are not conspicuous. The conditions show an example in which, amplification of the video image signal is performed when a video image signal meets predetermined conditions.

Operation Example 3-5

In this operation example, an input video image signal is a video image whose histogram of video image signals is distributed in low luminance video image signals, and in bright luminance at not a little rate, and an APL thereof is 22% as shown in FIG. 16 (B). As described in the operation example 1-5 of the above example 1, in the distortion module 5, 70% where the expression of black color is possible and can be maintained as high as possible, is selected as a light emission luminance level of a backlight light source $BL_{reduced}$ from an evaluation value of the histogram.

Here, when a light emission luminance level for reference $BL_{Ref}$ is set to be 105%, a gain at this time is $(105/70)^{1/2.2}=1.20$, and limit luminance that causes the clipped whites is $255/1.20=213$.

Then, in the input video image signal of this example, luminance of 213 or more exists W % (5% here) or more, therefore 100% is set as a light emission luminance level for reference $BL_{Ref}$. Accordingly, again set by the configuration design portion 13 is $(100/70)^{1/2.2}=1.18$, and amplification of a video image is performed. The expression of black color is thereby maintained and the clipped whites are prevented from occurring more than necessary. In this example, the expression of black and the prevention of the clipped whites have priority over the brightness feeling. The conditions are an example in which, amplification is performed when a video image signal does not meet the predetermined conditions. Also in this case, amplification is performed when the predetermined conditions are not met and light source luminance becomes lower than the maximum luminance.

Operation Example 3-6

In this operation example, an input video image signal is a video image whose histogram of video image signals is distributed totally in low luminance, and an APL thereof is 25% as shown in FIG. 16 (C). As described in the operation example 1-6 of the above example 1, in the distortion module 5, since high luminance hardly exists in the histogram, from an evaluation value thereof, 50% is selected as a light emission luminance level of a backlight light source $BL_{reduced}$.

Here, when a light emission luminance level for reference $BL_{Ref}$ is set to be 105%, a gain at this time is $(105/50)^{1/2.2}=1.40$, and limit luminance that causes the clipped whites is $255/1.40=182$.

Then, in the input video image signal of this example, luminance of 182 or more hardly exists and is less than W % (5% here), therefore 105% is set as a light emission luminance level for reference $BL_{Ref}$. Accordingly, a gain set by the configuration design 2=portion 13 is $(105/50)^{1/2.2}=1.40$, and amplification of a video image is performed. It is thereby possible to allow occurrence of the clipped whites that is hardly influenced and display a video image in which the brightness feeling has a priority by ignoring a signal on a high luminance side that slightly exists. The conditions are an example in which, amplification of a video image signal is performed when a video image signal meets predetermined conditions.

Example 4

This example is that, in a configuration of the present invention in which an input video image signal is amplified all the time when a video image characteristic amount meets predetermined conditions, and has a case where the input image signal is amplified and a case of not amplified when the video image characteristic amount does not meet the predetermined conditions, as the above video image characteristic amount, uses the APL of the input video image signal and a frequency that could not be expressed, if expanded, out of the input signals are used, and the predetermined conditions are that the APL of the input video image signal is a predetermined value or less and the frequency is a predetermined rate or less.

In this example, both the APL of the video image in the example 1 or 2 and the frequency of the clipped whites in the example 3 are detected as a video image characteristic amount, and when the APL is in a predetermined range and the frequency of the clipped whites is less than W %, a light emission luminance level for reference $BL_{Ref}$ is set at a value greater than 100% that can not be output originally.

That is, in this example, the predetermined conditions are set as the conditions "meeting both conditions in the example 1 and 2, and conditions in the example 3", and the APL appeals a middle level brightness contrast feeling and influence of the clipped whites is sufficiently considered.

Various settings in this example are similarly to the example 1 as follows:
a) a panel CR (contrast ratio of a panel that is used); 2000
b) a target CR (contrast ratio of a panel that is a target); 3500
c) a luminance control range of backlight; 20% to 100%

In this example, when the APL is the first value L1 or more and is the second value L2 or less (example 1) as shown in FIG. 14 (B), and a light emission luminance level for reference $BL_{Ref}$ is set to be 105% when an estimated frequency of the clipped whites is less than W % (less than 5%, for example) as shown in FIG. 18, and, setting is made to be 100% when both of these conditions of the APL and the clipped whites are not met.

When the same example as the input video image signal employed in the example 1 is used, the operation example 1-1 to the operation example 1-3 do not meet conditions that the APL is a middle level similar to the description in the example 1 and do not meet conditions that the clipped whites frequency is less than 5% as described in the operation example 3-1 to the operation example 3-3, and therefore, an operation thereof is similar to the example 1 to example 3.

Operation Example 4-4

Description will be given for an operation example of this example by the video image signal of the operation example 1-4 of the example 1. In this operation example, an input video image signal is a video image whose histogram of video image signals is distributed on high luminance side and low luminance side at the same rate with intermediate luminance as a center, and an APL thereof is 48% as shown in FIG. 16 (A). As described in the operation example 1-4 of the above example 1, since a video image with extremely high luminance does not exist in the histogram of the video image signal of this example, in the distortion module 5, 60% is selected as a light emission luminance level of a backlight light source $BL_{reduced}$ from an evaluation value of the histogram.

Then, as described in the operation example 1-4 of the example 1, when the APL is 48%, the predetermined conditions of the luminance control properties shown in FIG. 14 (B) of the example 1, that is, that the APL is the first value L1 or more and is the second value L2 or less are met. In addition, a case where the conditions of FIG. 17 of the example 2 are used also satisfies that the APL is a third value L3 or less.

In addition, when a light emission luminance level for reference $BL_{Ref}$ is set to be 105%, a gain at this time is $(105/60)^{1/2.2}=1.29$, and limit luminance that causes the clipped whites is $255/1.29=198$. Then, the input video image signal of this example, meet conditions that the frequency of a video image that causes the clipped whites is a predetermined rate or less, since luminance of 198 or more hardly exists and is less than W % (5% here).

In this way, since both the conditions of the APL and the frequency of causing the clipped whites are satisfied, 105% is set as a light emission luminance level for reference $BL_{Ref}$. Accordingly, a gain set by the configuration design portion 13 is $(105/60)^{1/2.2}=1.29$, and amplification of a video image is performed. It is thereby possible to appeal the brightness feeling more than usual, and the clipped whites are not conspicuous since pixels hardly exist in the clipped whites region. The conditions are an example in which, amplification of a video image signal is performed when a video image signal meets predetermined conditions.

Operation Example 4-5

Description will be given for an operation example of this example by the video image signal of the operation example 1-5 of the example 1. In this operation example, an input video image signal is a video image whose histogram of video image signals is distributed in low luminance video image signals, and in bright luminance at not a little rate, and an APL thereof is 22% as shown in FIG. 16 (B).

As described in the operation example 1-5 of the above example 1, extremely high luminance exists at not a little rate in the histogram of the video image signal of this example, however, in the distortion module 5, a value of an evaluation value (Distortion) becomes great when 100% is selected as a light emission luminance level of a backlight light source $BL_{reduced}$, therefore, 70% where the expression of black color is possible and can be maintained as high as possible, is selected as a light emission luminance level $BL_{reduced}$.

Then, as described in the operation example 1-5 of the example 1, when the APL is 22%, the predetermined conditions of the luminance control properties shown in FIG. 14 (B) of the example 1, that is, that the APL is the first value L1 or more and is the second value L2 or less, are not met. On the other hand, the predetermined conditions that the APL is the predetermined value L3 or less are met when the predetermined conditions of the luminance control properties shown in FIG. 17 are used, like in the example 2.

When a light emission luminance level for reference $BL_{Ref}$ is set to be 105%, a gain at this time is $(105/70)^{1/2.2}=1.20$, and limit luminance that causes the clipped whites is 255/1.29=213. Then, the input video image signal of this example does not meet conditions that the frequency of a video image that causes the clipped whites is a predetermined rate or less since luminance of 213 or more exists W % (5% here) or more.

In this example, the predetermined conditions of the APL and the frequency that causes the clipped whites are not met, therefore 100% is set as a light emission luminance level for reference $BL_{Ref}$. Accordingly, a gain set by the configuration design portion 13 is $(100/70)^{1/2.2}=1.18$, and amplification of a video image is performed. It is thereby possible to maintain the expression of black color and prevent the clipped whites from occurring more than necessary. The conditions show an example in which amplification of a video image signal is performed, when a video image signal does not meet predetermined conditions. In this case, amplification is performed, when the predetermined conditions are not met and light source luminance is lowered from the maximum luminance.

Operation Example 4-6

Description will be given for an operation example of this example by the video image signal of the operation example 1-6 of the example 1. In this operation example, an input video image signal is a video image whose histogram of video image signals is distributed totally in low luminance, and an APL thereof is 25% as shown in FIG. 16 (C).

As described in the operation example 1-6 of the above example 1, since a high luminance video image hardly exists in the histogram of the video image signal of this example, in the distortion module 5, 50% is selected as a light emission luminance level of a backlight light source $BL_{reduced}$ from an evaluation value of the histogram.

Then, as described in the operation example 1-6 of the example 1, when the APL is 25%, the predetermined conditions of the luminance control properties shown in FIG. 14 (B) of the example 1, that is, that the APL is the first value L1 or more and is the second value L2 or less, are not met. On the other hand, the predetermined conditions that the APL is the predetermined value L3 or less are met when the luminance control properties shown in FIG. 17 is used, like in the example 2.

When a light emission luminance level for reference $BL_{Ref}$ is set to be 105%, a gain at this time is $(105/50)^{1/2.2}=1.40$, and limit luminance that causes the clipped whites is 255/1.40=182. Then, an input video image signal of this example, meets conditions that the frequency of a video image that causes the clipped whites is a predetermined rate or less, since luminance of 182 does not exist W % (5% here) or more.

In this example, the predetermined conditions of the APL are not met when conditions of the example 1 are used as determination of the APL, and therefore, 100% is set as a light emission luminance level for reference $BL_{Ref}$. Accordingly, a gain set by the configuration design portion 13 is $(100/50)^{1/2.2}=1.37$, and amplification of a video image is performed.

On the other hand, the predetermined conditions of the APL are met when conditions of the example 2 are used as the determination of the APL and the predetermined conditions of the frequency that causes the clipped whites are also met. Accordingly, 105% is set as a light emission luminance level for reference $BL_{Ref}$ and a gain set by the configuration design portion 13 is $(105/50)^{1/2.2}=1.40$, and amplification of a video image is performed.

In this way, it is different depending on setting of determination of the APL in some cases whether or not the predetermined conditions of the APL and the frequency that causes the clipped whites are met. It is different depending on the setting of the APL, whether deepness of a black level is emphasized (corresponding to the example 1) and whether appealing of the brightness feeling (corresponding to the example 2) is emphasized.

Example 5

This example is that, in a configuration of the present invention in which an input video image signal is amplified all the time when a video image characteristic amount meets predetermined conditions, and has a case where an input image signal is amplified and a case of not amplified when the video image characteristic amount does not meet the predetermined conditions, as the above video image characteristic amount, the maximum luminance and the minimum luminance of the input video image signal are used and the predetermined conditions are that the minimum luminance of the input video image signal is the first value or more and the maximum luminance of the input video image signal is the second value or less.

In this example, the maximum luminance value (hereinafter, referred to as "MAX value") and the minimum luminance value (hereinafter, referred to as "MIN value") of the video image is detected as a video image characteristic amount for each image, and when the MIN value is the first value M1 or more and the MAX value is the second value M2 or less, a light emission luminance level for reference $BL_{Ref}$ is set at a value greater than 100% that can not be output originally. That is, in this example, the brightness contrast feeling is appealed only when the APL is a middle level, and in the other cases, influence of the clipped whites and the expression of black color are sufficiently considered.

Various settings in this example are similarly to the example 1 as follows:

a) a panel CR (contrast ratio of a panel that is used); 2000 b) a target CR (contrast ratio of a panel that is a target); 3500 c) a luminance control range of backlight; 20% to 100%

Figure 19:
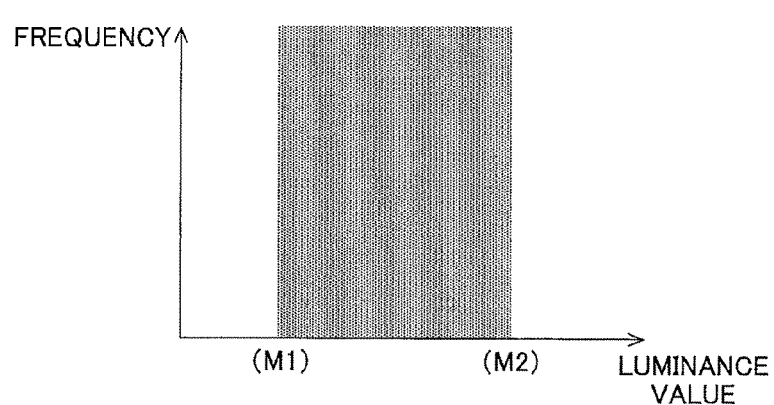
FIG. 19 is a diagram showing a relation between a luminance value that is used for advanced luminance modulation processing and a frequency.

In this example, as shown in FIG. 19, a light emission luminance level for reference $BL_{Ref}$ is set to be 105% when the MIN value of the input video image signal is the first value M1 or more and the MAX value is the second value M2 or less, and a light emission luminance level for reference $BL_{Ref}$ is set to be 100% when the MIN value is smaller than the first value M1 or the MAX value is greater than the second value M2.

The first value M1 is, for example, a luminance value 51 (20%) capable of demonstrating effect of emphasizing the black level. In addition, the second value M2 is a luminance value 204 (80%) that is originally high luminance and prevention of the clipped whites is desired more than the brightness feeling.

When the same example as the input video image signal employed in the example 1 is used, video image signals in the operation example 1-1 to the operation example 1-3 have luminance whose MAX value exceeds 204, and the predetermined conditions in this example (the MIN value is a luminance value 51 or more and the MAX value is a luminance value 204 or less) are not met, therefore a light emission luminance level for reference $BL_{Ref}$ is set to be 100%.

In addition, the video image signal in the operation example 1-5 and the operation example 1-6 of the example 1 has a luminance value whose MIN value is less than 51, and the predetermined conditions in this example (the MIN value is a luminance value 51 or more and the MAX value is a luminance value 204 or less) are not met, therefore a light emission luminance level for reference $BL_{Ref}$ is set to be 100%.

Description will hereinafter be given for a remaining operation of this example by the video image signal of the operation example 1-4 of the example 1.

Operation Example 5-4

An input video image signal in this operation example is a video image whose histogram of video image signals is distributed on high luminance side and low luminance side at the same rate with intermediate luminance as a center, and an APL thereof is 48% as shown in FIG. 16 (A).

As described in the operation example 1-4 of the above example 1, since a video image with extremely high luminance does not exist in the histogram of the video image signal of this example, in the distortion module 5, 60% is selected as a light emission luminance level of a backlight light source $BL_{reduced}$ from an evaluation value of the histogram.

Then, the input video image signal of this example meets the predetermined conditions that the MIN value is a luminance value 51 or more and the MAX value is a luminance value 204 or less, therefore 105% is set as a light emission luminance level for reference $BL_{Ref}$. Accordingly, a gain set by the configuration design portion 13 is $(105/60)^{1/2.2}=1.29$, and amplification of a video image is performed. It is thereby possible to appeal the brightness feeling more than usual, and since pixels hardly exist in the clipped whites region, the clipped whites is not conspicuous. The conditions show an example in which, amplification of a video image signal is performed when a video image signal meets predetermined conditions.

Example 6

This example is that, in a configuration of the present invention in which an input video image signal is amplified all the time when a video image characteristic amount meets predetermined conditions, and has a case where an input image signal is amplified and a case of not amplified when the video image characteristic amount does not meet the predetermined conditions, the APL of the input video image signal is used as the above video image characteristic amount and the predetermined conditions are that the APL of the input video image signal is the first value or more and the second value or less.

In addition, in this example, selection of a light emission luminance level of a backlight light source $BL_{reduced}$ is adjusted by the APL, not by calculation of distortion. In this example, for a light emission luminance level of a backlight light source $BL_{reduced}$, a low value is selected when there are many totally dark images, and a high value is selected when there are many totally bright images.

Figure 20:
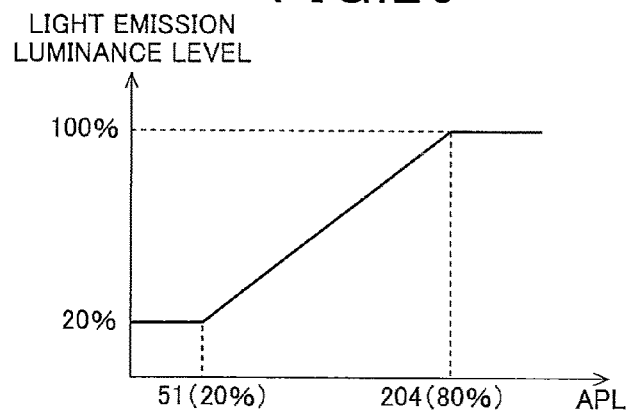
FIG. 20 is a diagram showing a relation between an APL that is used for advanced luminance modulation processing and a light emission luminance level for reference.

In this example, as shown in FIG. 20, a light emission luminance level of a backlight light source $BL_{reduced}$ is changed in accordance with the APL, and it is 20% when the APL is less than 51, for example, is 100% when the APL is greater than 204, for example, and when the APL is 51 or more and 204 or less, a value between 20% and 100% is selected in proportion to a size of the APL.

Then, a light emission luminance level for reference $BL_{Ref}$, similarly to the example 1, when APL is a middle level (L1 or more and L2 or less), is set at a value greater than 100% that can not be output originally. Description will hereinafter be given for an operation of this example using the same example of the input video image signal as the example 1.

Operation Example 6-1

In this operation example, an input video image signal is a video image whose histogram of video image signals is distributed in high luminance values around 255, and an APL thereof is 90% as shown in FIG. 15 (A). In this example, the APL of the input video image signal is 90%, therefore the distortion module 5 selects 100% as a light emission luminance level of a backlight light source $BL_{reduced}$. Note that, in this example, the distortion module 5 selects a light emission luminance level of a backlight light source $BL_{reduced}$ without calculating an evaluation value (Distortion), however, the distortion module 5 is described as the one replacing a selection block of a light emission luminance level of a backlight light source $BL_{reduced}$ in each of the above example. In this case, the distortion module 5 inputs the APL detected by an APL detection portion 3, and according to the APL, selection of a light emission luminance level of a backlight light source $BL_{reduced}$ is performed.

On the other hand, when the APL is 90%, the predetermined conditions that the above APL is a middle level are not met, therefore, 100% is set as a light emission luminance level for reference $BL_{Ref}$.

Accordingly, a gain set by the configuration design 2=portion 13 is $(100/100)^{1/2.2}=1$, and amplification of a video image is not performed. It is thereby possible to prevent the clipped whites of the video image signal with much high luminance. The conditions show an example in which, amplification of a video image signal is not performed when a video image characteristic amount (APL) of a video image signal does not meet predetermined conditions. In this case, amplification is not performed when the predetermined conditions are not met and light source luminance is the maximum luminance.

Operation Example 6-2

In this operation example, an input video image signal is a video image whose histogram of video image signals is distributed in high luminance values around 255 and also distributed around low luminance at not a little rate, and an APL thereof is 85% as shown in FIG. 15 (B).

In this example, the APL of the input video image signal is 85%, therefore the distortion module 5 selects 100% as a light emission luminance level of a backlight light source $BL_{reduced}$.

In addition, when the APL is 85%, the predetermined conditions that the above APL is a middle level are not met, therefore 100% is set as a light emission luminance level for reference $BL_{Ref}$.

Accordingly, a gain set by the configuration design portion 13 is $(100/100)^{1/2.2}=1$, and amplification of the video image signal is not performed. It is thereby possible to prevent the clipped whites of the video image signal with much high luminance. The conditions show an example in which, amplification of a video image signal is not performed, when a video image characteristic amount (APL) of a video image signal does not meet predetermined conditions. Also in this case, amplification is not performed, when the predetermined conditions are not met and light source luminance is the maximum luminance.

Operation Example 6-3

In this operation example, an input video image signal is a video image whose histogram of video image signals is distributed in luminance values around 230 and also distributed around low luminance at not a little rate, and an APL thereof is 85% as shown in FIG. 15 (C).

In this example, the APL of the input video image signal is 81%, therefore the distortion module 5 selects 100% as a light emission luminance level of a backlight light source $BL_{reduced}$.

In addition, when the APL is 85%, the predetermined conditions that the above APL is a middle level are not met, therefore 100% is set as a light emission luminance level for reference $BL_{Ref}$.

Accordingly, a gain set by the configuration design portion 13 is $(100/100)^{1/2.2}=1$, and amplification of a video image is not performed. It is not possible to reduce power consumption by not lowering alight emission luminance level of a backlight light source $BL_{reduced}$ from 100%, however, all the input video image signals can be expressed when the light emission luminance level $BL_{reduced}$ is 100%, and the clipped whites do not occur, therefore there is no problem as a video image expression. The conditions, differently from the operation example 1-3 of the example 1, show an example in which amplification of a video image signal is not performed when a video image characteristic amount (APL) of a video image signal does not meet predetermined conditions. Also in this case, amplification is not performed, when the predetermined conditions are not met and light source luminance is the maximum luminance.

Operation Example 6-4

In this operation example, an input video image signal is a video image whose histogram of video image signals is distributed on high luminance side and low luminance side at the same rate with intermediate luminance as a center, and an APL thereof is 48% as shown in FIG. 16 (A).

In this example, the APL of the input video image signal is 48%, therefore the distortion module 5 selects, for example, 50% as a light emission luminance level of a backlight light source $BL_{reduced}$.

In addition, when the APL is 48%, the predetermined conditions that the above APL is a middle level are met, therefore, 105% is set as a light emission luminance level for reference $BL_{Ref}$.

Accordingly, a gain set by the configuration design portion 13 is $(105/50)^{1/2.2}=1.40$, and amplification of a video image is performed. Here, in addition to a compensation amount for the amount that a light emission luminance level of a backlight light source $BL_{reduced}$ is slightly lowered, a light emission luminance level for reference $BL_{Ref}$ is set at a value exceeding 100%, therefore, the video image signal is amplified a little bit greater, therefore a video image display with a high contrast and the brightness feeling can be performed. The conditions show an example in which, amplification is performed, when a characteristic amount (APL) of a video image signal meets the predetermined conditions.

Operation Example 6-5

In this operation example, an input video image signal is a video image whose histogram of video image signals is distributed in low luminance, and in bright luminance at a little rate, and an APL thereof is 22% as shown in FIG. 16 (B).

In this example, the APL is 22%, therefore the distortion module 5 selects 25%, for example, as a light emission luminance level of a backlight light source $BL_{reduced}$.

In addition, when the APL is 22%, the predetermined conditions that the above APL is a middle level are not met, therefore 100% is set as a light emission luminance level for reference $BL_{Ref}$.

Accordingly, a gain set by the configuration design portion 13 is $(100/25)^{1/2.2}=1.88$, and amplification of a video image is performed. Here, although the expression of black color is enriched by setting a light emission luminance level of a backlight light source $BL_{reduced}$ to be low, amplification of the video image signal is great comparing to that is the operation example 1-5, therefore, noise becomes large.

The conditions show an example in which amplification of a video image signal is performed, when a video image characteristic amount (APL) of a video images signal does not meet predetermined conditions. In this case, amplification is performed when the predetermined conditions are not met and light source luminance is lowered from the maximum luminance.

Operation Example 6-6

In this operation example, an input video image signal is a video image whose histogram of video image signals is distributed totally in low luminance, and an APL thereof is 25% as shown in FIG. 16 (C).

In this example, the APL is 25%, therefore the distortion module 5 selects 30%, for example, as a light emission luminance level of a backlight light source $BL_{reduced}$.

In addition, when the APL is 25%, the predetermined conditions that the above APL is a middle level are not met, therefore 100% is set as a light emission luminance level for reference $BL_{Ref}$.

Accordingly, a gain set by the configuration design portion 13 is $(100/30)^{1/2.2}=1.73$, and amplification of a video image is performed. It is thereby possible to appeal the black level. The conditions show an example in which amplification of a video image signal is performed, when a video image characteristic amount (APL) of a video image signal does not meet predetermined conditions. In this case, amplification is performed, when the predetermined conditions are not met and light source luminance is lowered from the maximum luminance.

In the above example, as an algorithm, it is easier to make a gain setting by gain calculation after selecting a light emission luminance level of a backlight light source $BL_{reduced}$ by the APL, however, of course, gain calculation may be performed first through the light emission luminance level calculated by the APL to make the gain setting, and thereafter, a luminance adjustment of a backlight light source may be performed followingly.

Example 7

This example is that, in a configuration of the present invention in which an input video image signal is amplified all the time when a video image characteristic amount meets predetermined conditions, and has a case where an input image signal is amplified and a case of not amplified when the video image characteristic amount does not meet the predetermined conditions the APL of the input video image signal is used as the above video image characteristic amount and the predetermined conditions are that the APL of the input video image signal is the first value or more and the second value or less. Here in the above example 1, a light emission luminance level for reference $BL_{Ref}$ is set to be 100%, when the APL is smaller than the first value L1 or greater than the second value L2, however, in this example, in a video image of a low APL with a little possibility of including a bright image, it is also possible to set a light emission luminance level for reference $BL_{Ref}$ at a value smaller than 100% considering power saving.

Figure 21:
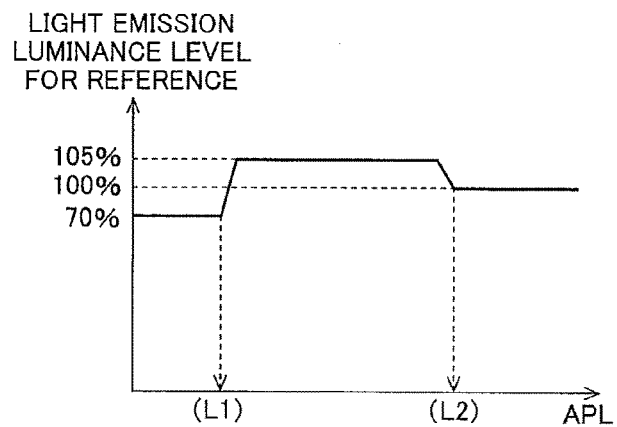
FIG. 21 is a diagram showing another example of a relation between an APL that is used for advanced luminance modulation processing and a light emission level for reference.

In this example, as shown in FIG. 21, a light emission luminance level for reference $BL_{Ref}$ is set to be 105%, when the APL is the first value L1 or more and is the second value L2 or less, and a light emission luminance level for reference $BL_{Ref}$ when the APL is smaller than the first value L1 is 70%. In addition, a light emission luminance level for reference $BL_{Ref}$ when the APL is greater than the second value L2 is 100% similar to the example 1.

Various settings in this example are as follows similarly to the example 1.

a) a panel CR (contrast ratio of a panel that is used); 2000 b) a target CR (contrast ratio of a panel that is a target); 3500 c) a luminance control range of backlight; 20% to 100%

When the same input video image signal employed in the example 1 is used, description will hereinafter be given for an operation of this example.

First, for the video image signal of the operation example 1-1 to the operation example 1-4 of the example 1 in which the APL is the first value L1 or more, similar operation is also performed in this example. Description will hereinafter be given for the operation example of this example in the video image signal used in the operation example 1-5 to the operation example 1-6 of the example 1.

Operation Example 7-5

In this operation example, an input video image signal is a video image whose histogram of video image signals is distributed in low luminance, and in bright luminance at a little rate, and an APL thereof is 22% as shown in FIG. 16 (B). In this case, extremely high luminance exists at not a little rate, in the histogram of the video image signal, however, a value of an evaluation value becomes great, when 100% is selected as a light emission luminance level of a backlight light source $BL_{reduced}$, therefore, 70% where the expression of black color is possible and can be maintained as high as possible, is selected as a light emission luminance level $BL_{reduced}$.

In addition, when the APL is 22%, the predetermined conditions of luminance control properties shown in FIG. 21, that is, that the APL is the first value L1 or more and is the second value L2 or less are not met, and the APL is smaller than the first value L1, therefore 70% is set as a light emission luminance level for reference $BL_{Ref}$. Accordingly, a gain set by the configuration design portion 13 is $(70/70)^{1/2.2}=1$, and amplification of a video image is not performed. In this case, it is possible to give a priority to power saving. The conditions show an example in which amplification is not performed, when a video image characteristic amount (APL) of a video image signal does not meet the predetermined conditions.

Operation Example 7-6

In this operation example, an input video image signal is a video image whose histogram of video image signals is distributed totally in low luminance, and an APL thereof is 25% as shown in FIG. 16 (C). In this case, high luminance hardly exists in the histogram of a video image signal, therefore in the distortion module 5, 50% that is a low level is selected as a light emission luminance level of a backlight light source $BL_{reduced}$ from an evaluation value of the histogram.

In addition, when the APL is 25%, the predetermined conditions of the luminance control properties shown in FIG. 21, that is, that the APL is the first value L1 or more and is the second value L2 or less, are not met, and the APL is smaller than the first value L1, therefore, a light emission luminance level for reference $BL_{Ref}$ is set to be 70%. Accordingly, a gain set by the configuration design portion 13 is $(70/50)^{1/2.2}=1.17$, and amplification of a video image is performed. In this case, video image signals hardly exist in the clipped whites region, therefore both expression of black and power saving are able to be achieved, while the clipped whites are being avoided. The conditions show an example in which, amplification of a video image signal is performed, when a video image characteristic amount (APL) of a video image signal does not meet the predetermined conditions.

As described above, when a video image signal does not exist in a high luminance region, this example is especially effective.

Example 8

In each of the above examples, an amplification degree of a video image signal has been determined with respect to a relation to luminance of a backlight light source, however, this example shows that even luminance of the backlight light source is constant, there is an effect of amplification of a video image signal in order to make the brightness feeling.

In this example, when luminance of the backlight light source is constant, a setting of a light emission luminance level for reference $BL_{Ref}$ in the example 1 and a setting of a light emission luminance level for reference $BL_{Ref}$ in the example 2 are changed respectively depending on conditions of a video image characteristic amount.

Figure 22:
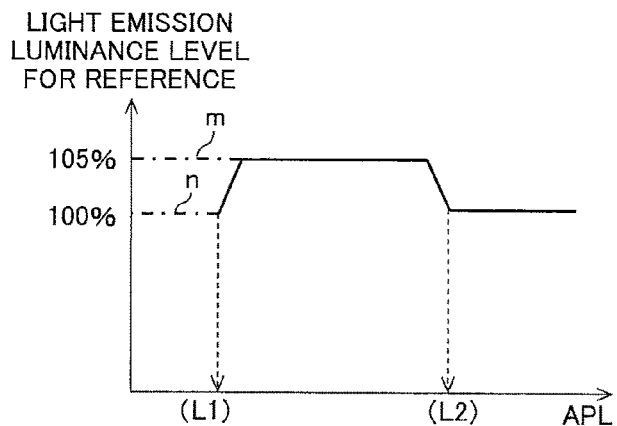
FIG. 22 is a diagram showing still another example of a relation between an APL that is used for advanced luminance modulation processing and a light emission luminance level for reference.
Figure 23:
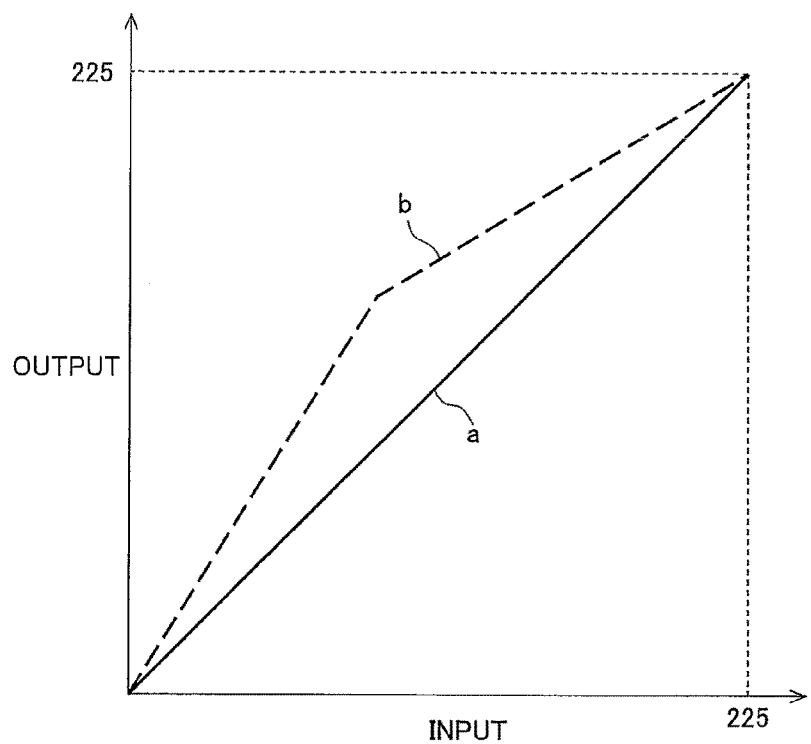
FIG. 23 is a diagram showing an input-output relation of a video image signal described in Patent Document 3.
Figure 24:
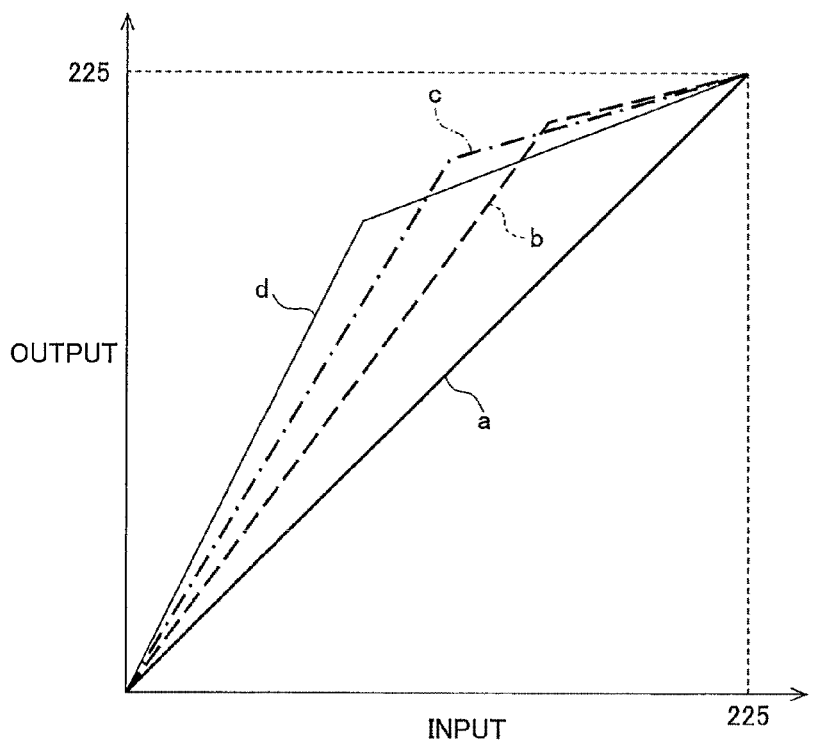
FIG. 24 is a diagram showing an input-output relation of a video image signal described in Patent Document 4.

Specifically, a light emission luminance level of backlight is fixed to 100%. Then, as shown in FIG. 22, when the APL is smaller than the first value L1, in a case where a peak as a video image characteristic amount is a predetermined value (204 (80%), for example) or more, a light emission luminance level for reference $BL_{Ref}$ is set to be 105% (m of FIG. 22), and in a case where a peak is smaller than a predetermined value, a light emission luminance level for reference $BL_{Ref}$ is set to be 100% (n of FIG. 22).

In this example, as predetermined conditions, the case is "the APL of an input video image signal is a middle level or less and when the APL is low, having a peak of a predetermined value or more", and in that case, a light emission luminance level for reference $BL_{Ref}$ is set at a value exceeding 100% (105% here).

Various settings in this example are as follows.
a) a panel CR (contrast ratio of a panel that is used); 2000
b) a target CR (contrast ratio of a panel that is a target); 3500
c) a luminance control range of backlight; 20% to 100%

Description will hereinafter be given for an operation of this example using the same video image signal used in the example 1.

In the operation example 1-1 and the operation example 1-2 of the example 1, a light emission luminance level $BL_{reduced}$ that is selected is 100%, and a setting of a light emission luminance level for reference $BL_{Ref}$ is also in a region in which the APL is high, also in this example, an operation similar to these example 1 is performed. Description will hereinafter be given for an operation example of this example by the video image signal of the operation example 1-3 to the operation example 1-6 of the example 1.

Operation Example 8-3

In this operation example, an input video image signal is a video image whose histogram of video image signals is distributed in luminance values around 230 and also distributed around low luminance at not a little rate, and an APL thereof is 81% as shown in FIG. 15 (C).

In this example, since the APL is 81%, the predetermined conditions that a peak is a predetermined value (80%) or more are met. However, conditions that the APL is lower than the first value L1 are not met, therefore the predetermined conditions according to this example (the APL of an input video image signal is a middle level or less and when the APL is low, having a peak of a predetermined value or more) are not met. Accordingly, 100% is set as a light emission luminance level for reference $BL_{Ref}$.

Accordingly, a gain set by the configuration design portion 13 is $(100/100)^{1/2.2}=1$, and amplification of a video image is not performed. In this example, being different from the operation example 1-3, an operation of lowering luminance of a backlight light source is not performed, however, there is no disadvantage other than that power consumption is slightly increased. The conditions show an example in which, amplification of a video image signal is not performed, when a video image characteristic amount (APL) of a video image signal does not meet predetermined conditions. In this case, amplification is not performed when the predetermined conditions are not met and light source luminance is the maximum luminance.

Operation Example 8-4

In this operation example, an input video image signal is a video image whose histogram of video image signals is distributed on high luminance side and low luminance side at the same rate with intermediate luminance as a center, and an APL thereof is 48% as shown in FIG. 16 (A).

In this example, conditions that a peak of the input video image signal is a predetermined value (80%) or more are met, and conditions that the APL is lower than the first value L1 are met, therefore the predetermined conditions according to this example (the APL of an input video image signal is a middle level or less and when the APL is low, having a peak of a predetermined value or more) are met. Accordingly, 105% is set as a light emission luminance level for reference $BL_{Ref}$.

Accordingly, a gain set by the configuration design portion 13 is $(105/100)^{1/2.2}=1.02$, and amplification of a video image is performed. In this operation example, being different from the operation example 1-3, an operation of lowering luminance of a backlight light source is not performed, however, there is no disadvantage other than that power consumption is slightly increased since the brightness contrast feeling is caused to be greater. The conditions show an example in which amplification of the video image signal is performed, when a video image characteristic amount (APL) of a video image signal meets predetermined conditions.

Operation Example 8-5

In this operation example, an input video image signal is a video image whose histogram of video image signals is distributed in low luminance, and in bright luminance at a little rate, and an APL thereof is 22% as shown in FIG. 16 (B).

In this example, conditions that a peak of the input video image signal is a predetermined value (80%) or more are met, and conditions that the APL is lower than the first value L1 are met, therefore the predetermined conditions according to this example (the APL of an input video image signal is a middle level or less and when the APL is low, having a peak of a predetermined value or more) are met. Accordingly, 105% is set as a light emission luminance level for reference $BL_{Ref}$.

Accordingly, a gain set by the configuration design portion 13 is $(105/100)^{1/2.2}=1.02$, and amplification of a video image is performed. In this operation example, although power consumption is increased, a video image expression emphasizing a peak can be performed, and a brightness contrast feeling can be obtained. The conditions are an example in which amplification of the video image signal is performed, when a video image characteristic amount of a video image signal meets predetermined conditions.

Operation Example 8-6

In this operation example, an input video image signal is a video image whose histogram of video image signals is distributed totally in low luminance, and an APL thereof is 25% as shown in FIG. 16 (C).

In this example, conditions that the APL is lower than the first value L1 are met, however, conditions that a peak of the input video image signal is a predetermined value (80%) or more are not met. Accordingly, the predetermined conditions according to this example (the APL of an input video image signal is a middle level or less and when the APL is low, having a peak of a predetermined value or more) are not met. Accordingly, 100% is set as a light emission luminance level for reference $BL_{Ref}$.

A gain set by the configuration design portion 13 is $(100/100)^{1/2.2}=1$, and amplification of a video image is not performed. In this operation example, an effect of the black level and reduction of power consumption can not be obtained. In addition, since there is no peak and a normal video image display is performed, without expressing the brightness contrast feeling. The conditions show an example in which, amplification is not performed, when a video image characteristic amount of a video image signal does not meet predetermined conditions and light source luminance is the maximum luminance.

Note that, in a gain setting example like this example above, the present invention is applicable even to other display apparatuses not including alight source like a liquid crystal display apparatus by performing calculation of gain not by a light emission luminance level of backlight.

Example 9

In this example, various parameters and settings that have been described in the example 1 to the example 8 are changed in accordance with an image quality mode.

The video image display apparatus is able to set the image quality mode as a video image display mode capable of performing a user setting. The image quality mode is a mode to optimize luminance or a contrast of a screen such that quality is suitable for contents of a content viewed by a user. Image quality modes include "a dynamic mode" for appealing the brightness contrast feeling entirely, "a normal mode" that is set at home or the like, "a movie mode" for beautifully expressing image quality of a movie in particular, "a game mode" in which there are many monotonous expressions and it is allowed not to give a priority to the image quality very much, "a power saving mode" for attaching more important to power consumption than to the image quality. In this example, description will be given assuming that the panel CR is 2000.

(Dynamic Mode)

In a dynamic mode, a video image is focused on showing more brightly and more clearly than standard while a video image expression is used so as to emphasize deepness of a black level. As such, a target CR is set at a large rate, for example, at 3500, comparing to a panel CR. A large target CR allows a black color that can not be expressed at 100% light emission luminance of backlight to be expressed as a black color closer to 0, thereby a degree of deepness of a black level can be enhanced.

Consequently, a light emission luminance level for reference $BL_{Ref}$ is set at a larger value than 100%, for example, at 102% that can not be output normally, under conditions of a middle level of an APL (corresponding to the above example 1) in order to show an image totally having intermediate brightness brightly and clearly. At this time, the first value L1 and the second value L2 of the example 1 may be changed comparing to other image quality modes.

As mentioned above, a bright image can be shown brighter and a dark part can be expressed darker. For example, at the time of a store front display and the like an image can be shown dynamically and is effective.

(Normal Mode)

Normal mode is a mode being mainly conscious of home use with a less adjustment frequency of backlight and a gain for focusing on performing a natural video image expression.

Additionally, assuming a high frequency of use, a setting is made to be able to achieve a certain level of power saving. Therefore, in a normal mode, a target CR is set smaller, for example, 2100, and lowering power consumption is also considered along with a natural video image expression. Moreover, in a normal mode, a light emission luminance level for reference $BL_{Ref}$ is tried not to be set at a value greater than 100%. In this mode, like the above example 7, a light emission luminance level for reference $BL_{Ref}$ may be set at a value smaller than 100%.

(Power Saving Mode)

In this example, power saving is emphasized by setting a target CR greater, for example, 3500, fixing a light emission luminance level for reference $BL_{Ref}$ at 70% and the like.

(Movie Mode)

Movie mode is a mode that emphasizes faithful reproduction of a video image to express more realistic black. Therefore, in the movie mode, a target CR is set at a greater value, for example, at 3500. Realistic black is thereby emphasized while power saving is also achieved. Some clipped whites are however allowed.

(Game Mode)

In a game mode, more importance is attached to the power saving than to the image quality because requirements for reproduction of the image quality are not high. For example, in the above example 8, a light emission luminance level for reference $BL_{Ref}$ is constantly set at a value smaller than 100% and is changed in accordance with an APL.

As mentioned above, in this example, various parameter settings are changed in accordance with a quality mode. As parameters to be changed, there is a target CR in accordance with a quality mode.

Additionally, predetermined conditions that an input video image signal is amplified all the time are changed in accordance with a quality mode.

For example, (1) conditions that an input video image APL is a predetermined value or less; (2) conditions that an input video image APL is a first value or more and a second value or less; (3) conditions that a frequency that could not be expressed if expended is a predetermined rate or less in the case of expansion; (4) conditions that average luminance of an input video image signal is a predetermined value or less and a frequency that could not be expressed if expanded, out of input signals is a predetermined rate or less; (5) conditions that average luminance of an input video image is the first value or more and the second value or less, and a frequency that could not be expressed if expanded, out of input signals is a predetermined rate or less; (6) conditions that a minimum luminance of an input video image signal is the first value or more and maximum luminance of an input video image signal is the second value or less; and the like can be changed in accordance with an image quality mode.

Specifically, when the operation example 3 of each example is used, predetermined conditions related to a video image characteristic amount may be changed in accordance with an image quality mode, in a dynamic mode, for example, using the <example 3>, in a power saving mode, for example, using the <example 8> in which a light emission luminance level for reference $BL_{Ref}$ is fixed at 70%, and the like.

Alternatively, a predetermined value in conditions of the above (1) or a predetermined value in conditions of the above (4) may be changed in accordance with an image quality mode. Furthermore, a first value and/or a second value in conditions of the above (2), (5) or (6) may be changed in accordance with an image quality mode. Moreover, predetermined rates of (3) to (5) may be changed in accordance with an image quality mode.

Note that, only one parameter may be changed in accordance with an image quality mode and a change by a combination thereof may also be allowed.

Additionally, the present invention explained above, when a light source is used, may use anything such as a fluorescent tube, LED and organic EL illumination.

Moreover, extraction of a video image characteristic amount, a setting/application of predetermined conditions and a video image expression thereby may be allowed to be divided into a plurality of display screens to be performed for each area.

INDUSTRIAL APPLICABILITY

The present invention can be used in a display apparatus such as a broadcasting receiver.

The invention claimed is:

1. A video image display apparatus that determines whether to amplify the input video image signal in accordance with a video image characteristic amount of an input video image signal, wherein
responsive to the video image characteristic amount meeting predetermined conditions, performing amplification on the input video image signal;
responsive to the video image characteristic amount failing to meet predetermined conditions, determining whether to perform amplification on the input video image signal, wherein
the video image characteristic amount is a frequency of a video signal that cannot be expressed in gradation due to the characteristics of a display portion when expanding an input signal with a predetermined amplification degree,
and the predetermined condition is that the frequency is a predetermined rate or less.

2. The video image display apparatus as defined in claim 1, wherein
the video image characteristic amount is average luminance of an input video image signal, and
the predetermined condition is that average luminance of the input video image is a predetermined value or less.

3. The video image display apparatus as defined in claim 2, wherein the predetermined value is changed in accordance with an image quality mode.

4. The video image display apparatus as defined in claim 1, wherein
the video image characteristic amount is average luminance of an input video image signal, and
the predetermined condition is that average luminance of the input video image is a first value or more and a second value or less.

5. The video image display apparatus as defined in claim 4, wherein the at least one of the first value and second value are changed in accordance with an image quality mode.

6. The video image display apparatus as defined in claim 1, wherein the predetermined conditions are changed in accordance with an image quality mode.

7. The video image display apparatus as defined in claim 1, wherein the predetermined rate is changed in accordance with an image quality mode.

8. A video image display apparatus that determines whether to amplify the input video image signal in accordance with a video image characteristic amount of an input video image signal, wherein
responsive to the video image characteristic amount meeting predetermined conditions, performing amplification on the input video image signal;
responsive to the video image characteristic amount failing to meet predetermined conditions, determining whether to perform amplification on the input video image signal, wherein
the video image characteristic amount is average luminance of video signals and a frequency that cannot be expressed in gradation due to the characteristics of a display portion when expanding an input signal with a predetermined amplification degree, and
the predetermined conditions are that the average luminance is a predetermined value or less and the frequency is a predetermined rate or less.

9. A video image display apparatus that determines whether to amplify the input video image signal in accordance with a video image characteristic amount of an input video image signal, wherein
responsive to the video image characteristic amount meeting predetermined conditions, performing amplification on the input video image signal;
responsive to the video image characteristic amount failing to meet predetermined conditions, determining whether to perform amplification on the input video image signal, wherein
the video image characteristic amount is a frequency of a video signal that cannot be expressed in gradation due to the characteristics of a display portion when expanding an input signal with a predetermined amplification degree, and
the predetermined conditions are that average luminance of the input video image is a first value or more and a second value or less and additionally the average luminance is a predetermined value or less and the frequency is a predetermined rate or less.

10. The video image display apparatus as defined in claim 1, wherein
the video image characteristic amount is the maximum luminance and the minimum luminance of an input video image signal, and
the predetermined conditions are that the minimum luminance of the input video image signal is a first value or more and the maximum luminance of the input video image signal is a second value or less.

11. A video image display apparatus that determines whether to amplify the input video image signal in accordance with a video image characteristic amount of an input video image signal, wherein
responsive to the video image characteristic amount meeting predetermined conditions, performing amplification on the input video image signal;
responsive to the video image characteristic amount failing to meet predetermined conditions, determining whether to perform amplification on the input video image signal,
the video image display apparatus including a display portion and a light source, inputs the video image signal to the display portion and irradiates a light from the light source on the display portion to display a video image,
wherein in a case where the video image characteristic amount does not meet predetermined conditions, the determination that the input video image signal is not amplified is responsive to when the light source luminance is the maximum luminance, and the determination that the input video image signal is amplified is responsive to when the light source luminance is lowered from the maximum luminance.

12. The video image display apparatus as defined in claim 11, wherein the amplification degree of a video image signal is determined based on light emission luminance of the light source.

13. The video image display apparatus as defined in claim 12, wherein the amplification degree of a video image signal is determined also considering a targeted light emission luminance value of the light source.

14. The video image display apparatus as defined in claim 13, wherein the targeted light emission luminance value of the light source is set to be a value greater than 100%.

15. A video image display apparatus that determines whether to amplify the input video image signal in accordance with a video image characteristic amount of an input video image signal, wherein
- responsive to the video image characteristic amount meeting predetermined conditions, performing amplification on the input video image signal;
- responsive to the video image characteristic amount failing to meet predetermined conditions, determining whether to perform amplification on the input video image signal,
- the video image display apparatus including a display portion and a light source, inputs the video image signal to the display portion and irradiates a light from the light source on the display portion to display a video image,
- wherein the amplification degree of a video image signal is determined based on light emission luminance of the light source, wherein the amplification degree of a video image signal, at the time when light emission luminance of the light source is at maximum, is set to be a value greater than a value capable of appropriately displaying an input video image signal of maximum luminance.

* * * * *